United States Patent
Kumar et al.

(10) Patent No.: US 10,257,117 B2
(45) Date of Patent: Apr. 9, 2019

(54) DISTRIBUTED SWITCH ARCHITECTURE

(71) Applicant: AVAGO TECHNOLOGIES INTERNATIONAL SALES PTE. LIMITED

(72) Inventors: Amit Kumar, Fremont, CA (US); William Brad Matthews, San Jose, CA (US); Bruce Hui Kwan, Sunnyvale, CA (US); Puneet Agarwal, Cupertino, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 188 days.

(21) Appl. No.: 14/927,103

(22) Filed: Oct. 29, 2015

(65) Prior Publication Data

US 2016/0127267 A1 May 5, 2016

Related U.S. Application Data

(60) Provisional application No. 62/075,621, filed on Nov. 5, 2014, provisional application No. 62/247,673, filed on Oct. 28, 2015.

(51) Int. Cl.
*H04L 12/933* (2013.01)
*H04L 12/947* (2013.01)

(52) U.S. Cl.
CPC ............ *H04L 49/10* (2013.01); *H04L 49/252* (2013.01)

(58) Field of Classification Search
USPC ....................................................... 370/400
See application file for complete search history.

(56) References Cited

U.S. PATENT DOCUMENTS

| | | | | |
|---|---|---|---|---|
| 7,292,580 | B2* | 11/2007 | Ramamurthy | H04L 12/5601 370/235 |
| 7,969,971 | B2* | 6/2011 | Gai | H04L 12/4633 370/389 |
| 8,149,710 | B2* | 4/2012 | Bergamasco | H04L 47/29 370/230 |
| 8,160,094 | B2* | 4/2012 | Cafiero | H04L 12/4625 370/389 |
| 8,274,887 | B2* | 9/2012 | Petersen | H04L 12/4633 370/230 |
| 8,345,701 | B1* | 1/2013 | Davis | H04L 49/10 370/412 |
| 8,797,877 | B1* | 8/2014 | Perla | H04L 49/00 370/230 |
| 9,008,113 | B2* | 4/2015 | Pope | G06F 13/128 370/419 |

(Continued)

*Primary Examiner* — Gregory B Sefcheck
*Assistant Examiner* — Majid Esmaelian
(74) *Attorney, Agent, or Firm* — Xsensus, LLP

(57) ABSTRACT

A distributed switch architecture supports very high bandwidth applications. For instance, the distributed switch architecture may be implemented for cloud networks. The architecture scales by organizing traffic management components into tiled structures with distributed buffering. The tile structures are replicated and interconnected to perform transfers from ingress to egress using an interconnect bandwidth scheduling algorithm. Bandwidth scaling may be achieved by adding more tiles to achieve higher bandwidth. The interconnect in the architecture may be swapped out depending on implementation parameters, e.g., physical efficiency.

18 Claims, 18 Drawing Sheets

(56) References Cited

U.S. PATENT DOCUMENTS

| | | | | |
|---|---|---|---|---|
| 9,100,313 | B1* | 8/2015 | Mazzola | H04L 49/101 |
| 2002/0196778 | A1* | 12/2002 | Colmant | H04L 12/5601 |
| | | | | 370/352 |
| 2003/0048792 | A1* | 3/2003 | Xu | H04L 49/104 |
| | | | | 370/400 |
| 2004/0151197 | A1* | 8/2004 | Hui | H04L 47/2416 |
| | | | | 370/412 |
| 2005/0243716 | A1* | 11/2005 | Bitar | H04L 1/22 |
| | | | | 370/218 |
| 2006/0101140 | A1* | 5/2006 | Gai | H04L 12/4633 |
| | | | | 709/224 |
| 2012/0033662 | A1* | 2/2012 | Szymanski | H04L 49/101 |
| | | | | 370/355 |
| 2012/0155256 | A1* | 6/2012 | Pope | G06F 13/128 |
| | | | | 370/230 |
| 2016/0226797 | A1* | 8/2016 | Aravinthan | H04L 49/3027 |

* cited by examiner

DISTRIBUTED SWITCH ARCHITECTURE

PRIORITY CLAIM

This application claims priority to U.S. Provisional Application 62/075,621, filed 5 Nov. 2014, and U.S. Provisional Application 62/247,673, filed 28 Oct. 2015, both of which are entirely incorporated by reference.

TECHNICAL FIELD

This disclosure relates to network communications. This disclosure also relates to a distributed switch architecture for cloud networks.

BACKGROUND

High speed data networks form part of the backbone of what has become indispensable worldwide data connectivity. Within the data networks, network devices such as switches direct data packets from source ports to destination ports, helping to eventually guide the data packets from a source to a destination. Improvements in switch architecture will further enhance performance of data networks.

BRIEF DESCRIPTION OF THE DRAWINGS

FIG. 13 shows a distributed buffering switch architecture that supports cut through.

DETAILED DESCRIPTION

Cloud networks place great demands on switch architecture. The architecture described below helps cloud networks meet multi-terabit bandwidth requirements. The architecture helps avoid high cost and high power consumption memories without considerable re-architecting and re-designing of major components in the traffic management and packet buffer functions. The architecture implements a distributed algorithm that provides high bandwidth scalable switching with low latency, and provides both store-and-forward (SAF) and cut-through (CT) modes of packet transfer from ingress to egress.

The architecture achieves scaling using a distributed approach. Buffering is provided on both ingress and egress, as well as in the fabric interconnect between the ingress and egress. The buffering is combined with an intelligent, low latency algorithm for coordinating transfers from ingress to egress. In some implementations, the architecture meets high bandwidth targets using single port memories. The architecture may provide at least the same amount of advertised packet buffer as prior devices, using only half the circuit area. Viewed from another perspective, the architecture provides twice the buffering for the same circuit area cost.

Figure 1:
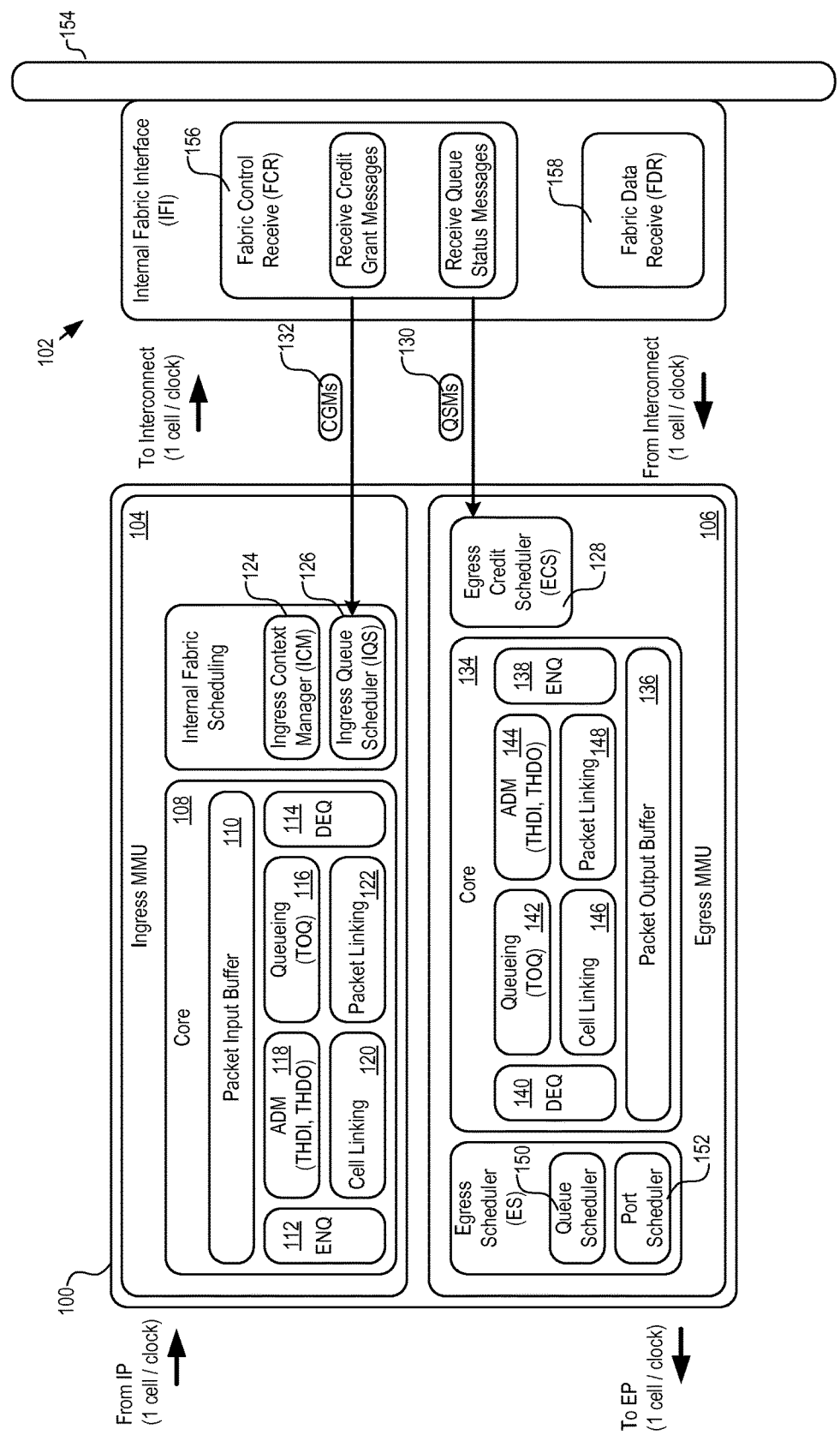
FIG. 1 shows an example of a memory management unit (MMU) tile.

FIG. 1 shows an example of a memory management unit (MMU) tile 100 in communication with an internal fabric interface (IFI) 102. Instances of the MMU tile 100 may be replicated as many times as desired to expand the capacity of the switch. Further, when the multiple instances are fabricated into a single integrated circuit, the resulting switch architecture achieves extremely low latency transfer of packets through a distributed buffering architecture that supports both SAF and CT modes. The MMU tile 100 may send cells to the IFI 102 at 1 cell/clock and receive cells from the IFI 102 at 1 cell/clock, as just one example. The MMU tile 100 includes an ingress MMU or tile 104 and an egress MMU or tile 106.

The ingress tile 104 includes a core 108 with a packet input buffer 110, which provides one of the several distributed buffers in the switch architecture. The architecture may define virtual output queues (VoQs) in the input buffer 110 when there are multiple tiles, to distinguish between multiple packets on different tiles potentially going out on the same queue. The core 108 also includes enqueue (ENQ) circuitry 112 (e.g., to place cells in the input buffer 110), dequeue circuitry (DEQ) 114 (e.g., to remove cells from the input buffer), and queue control circuitry 116 (e.g., to control packet dequeuing to select, for instance the top of queue (ToQ) packet from a given output queue that has buffered multiple packets awaiting switching). The core 108 also includes admission (ADM) control circuitry 118, cell linking circuitry 120, and packet linking circuitry 122. The ingress tile 104 further includes internal fabric scheduling through an ingress context manager (ICM) 124 and an ingress queue scheduler (IQS) 126, which may receive credit grant messages, e.g., through the IF from an egress tile.

The egress tile 106 includes an egress credit scheduler (ECS) 128. The ECS 128 may receive queue status messages (QSMs) 130, such as bandwidth credit request messages and bandwidth status update messages from the ingress tile, and responsively allocate bandwidth credits. The ingress tile 104 may, for instance, send a bandwidth credit request message to have the IQS circuitry 126 report to any connected egress tile that a given VoQ is ON or active, and that the VoQ should receive credits at a rate specified by a pre-configured QoS policy established through, e.g., a configuration interface. The ingress tile 104 may, for instance, send a bandwidth status update message to any connected egress tile to have the IQS circuitry 126 report that a given VoQ is OFF or inactive, indicating that the VoQ should stop receiving credits because the VoQ either has a credit surplus and/or no more data to transmit. The ingress tile 104 may receive credit grant messages 132 from the egress tile 106. Note that the credit request and grant messages are, specifically, bandwidth credit request and grant messages. That is, these messages request and allocate slices of bandwidth from the bandwidth available on the output ports.

The egress tile 106 also includes a core 134 with a packet output buffer 136, which provides another point of distributed buffering in the switch architecture. The core 134 also includes enqueue (ENQ) circuitry 138 (e.g., to place cells in the output buffer 136), dequeue circuitry (DEQ) 140 (e.g., to remove cells from the output buffer 136), and queue control circuitry 142 (e.g., to control packet dequeuing to select, for instance the top of queue (ToQ) packet from a given output queue that has buffered multiple packets awaiting transmission through an output port). The core 134 also includes admission control (ADM) circuitry 144, cell linking circuitry 146, and packet linking circuitry 148. The egress tile 106 further includes an egress scheduler with queue scheduling circuitry 150 and port scheduling circuitry 152. The queue scheduling circuitry 150 and port scheduling circuitry 152 schedule transmission of cells from the queues in the output buffer 136 through the ports connected to the egress tile 106.

Note that the IFI 102 defines an interface to a switching interconnect 154 that connects ingress tiles to egress tiles. The switching interconnect 154 may be a full mesh capable of connecting any input to any output, and with one or more IFIs may form a switching fabric. The IFI 102 may further include a separate fabric control receive (FCR) path 156 (e.g., for control messages) and fabric data receive (FDR) path 158 (e.g., including the SAF buffers 1004 and CT buffers 1320 described in FIGS. 10 and 13-18). The IFI 102 (and thus the switching fabric) may further include buffering, described in more detail below, that implements another instance of distributed buffering throughout the switch architecture. The switch architecture may implement other interconnect topologies. The switching interconnect 154 may be swapped out depending on implementation parameters, e.g., physical efficiency. For example, a new topology, e.g., a ring, may be more efficient for certain implementations (e.g., a very high bandwidth 10-20+ Tbps implementation).

The architecture scales by organizing traffic management components into tiled structures. The tile structures may be replicated and interconnected to perform transfers from ingress to egress using the low latency interconnect bandwidth scheduling algorithm described below. Bandwidth scaling may be achieved by adding more tiles to achieve higher bandwidth. As one beneficial result, only modest physical changes may allow bandwidth to scale to many multiple terabits per second.

Figure 2:
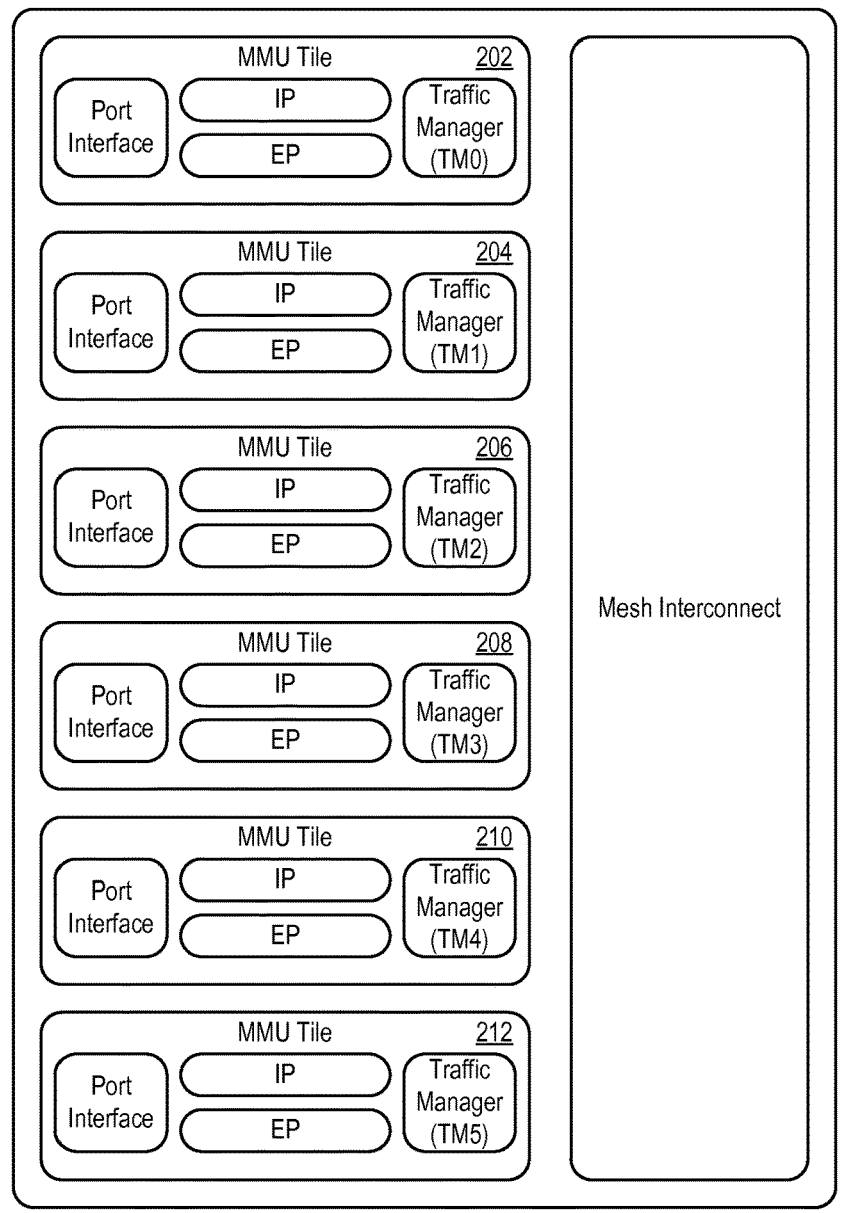
FIG. 2 shows a switch architecture.
Figure 3:
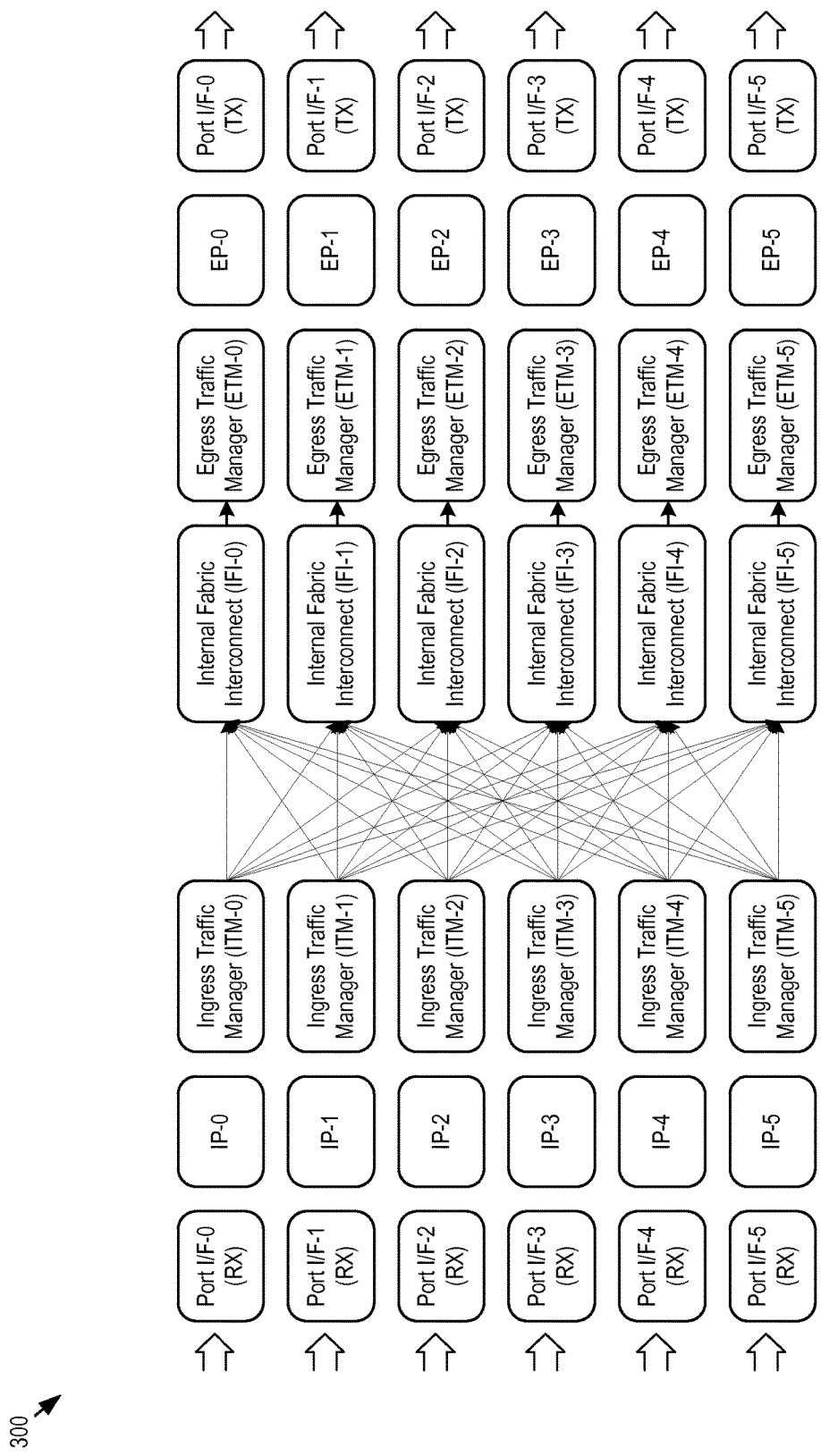
FIG. 3 shows a view of the switch architecture of FIG. 2, expanded to show flow from ingress to egress through the full mesh interconnect.

FIG. 2 shows a switch architecture 200. The switch architecture 200 includes six instances 202, 204, 206, 208, 210, and 212 of the MMU tile 100. The MMU tiles are connected through the switching fabric. Each MMU tile may support a specific number of ports, e.g., 4 ports per tile for a 24 port switch. FIG. 3 shows a view 300 of the switch architecture 200, expanded to show flow from ingress to egress through the full mesh interconnect. The switch architecture 200/300 may be fabricated on a single die.

The switch architecture 200/300 uses a unique buffering model. The buffering model does not use a single shared memory or cross-point memory to store packets. Instead, the buffering model uses multiple distinct and distributed buffering points. One buffering point is the input buffer 110. The input buffer 110 provides a primary buffering point for arriving packets that is located in the same tile containing the ingress port from which the packet was received. The output buffer 136 provides another buffering point. The output buffer 136 provides a secondary buffering point for departing packets that is located in the tile containing the egress port from which a packet is transmitted.

Packets buffered in the input buffer 110 are linked to VoQs. Each ingress traffic manager performs arbitration across the set of non-empty VoQs for transmission to an egress traffic manager (ETM). Packets, once received at the ETM, may be buffered again before transmission to an egress port. Buffering on the egress port may be provided for several reasons, including: flow control, e.g., in case the egress port or queue from which the packet must depart is currently flow controlled; under-run avoidance, e.g., packets may be buffered until an EoP cell is received at the egress tile to avoid underrun; and egress port contention, e.g., multiple packets may arrive to a egress port from different ingress tiles, with potentially different QoS requirements, and linking packets to an egress queue and then performing arbitration using the egress port scheduler may resolve such conflicts.

Figure 4:
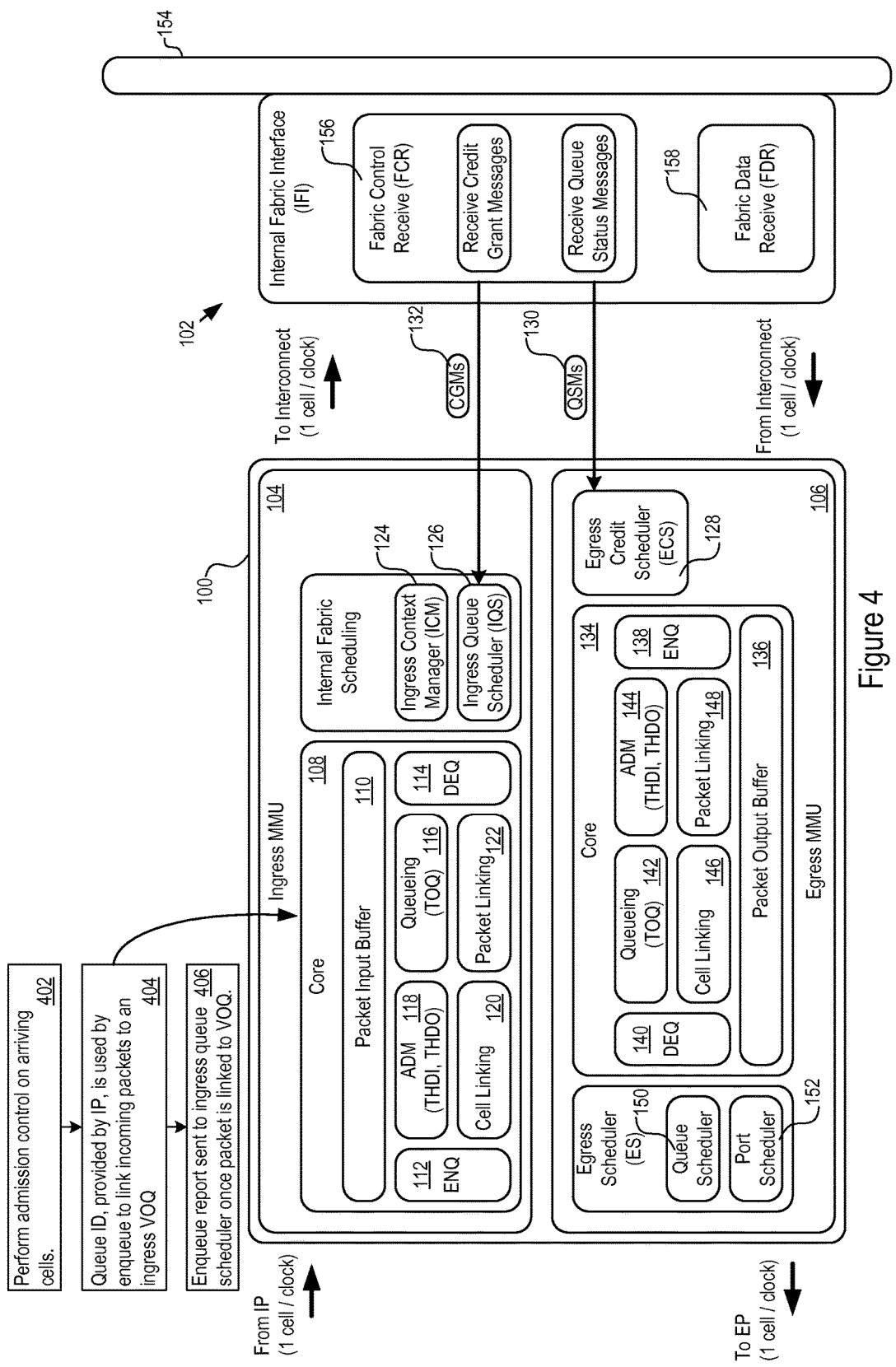
FIG. 4 begins an example of store and forward packet processing.

FIG. 4 begins an example of SAF packet processing. In FIG. 4, the ADM circuitry 118 performs admission control on arriving cells (402). In that role, the ADM circuitry 118 may decide whether to accept or drop packets. As part of this determination, the ADM circuitry 118 check buffer thresholds, both on the input and output side. On the input side, the ADM circuitry 118 may check against input thresholds depending on the input port that received the packet, to ensure that the input buffer 110 is shared among the input ports. Similarly, on the output side, the ADM circuitry 118 may check against output thresholds depending on the output ports, to ensure that the input buffer 110 provides packets to all of the output ports, rather than serving only one or a few busy output ports.

In the example of FIG. 4, the enqueue circuitry 112 uses a Queue ID, provided by the ingress pipeline (IP), to link incoming packets to an ingress Virtual Output Queue (VOQ) (404). In addition, an enqueue report is sent to the IQS circuitry 126 once the packet is linked to the VOQ (406).

Figure 5:
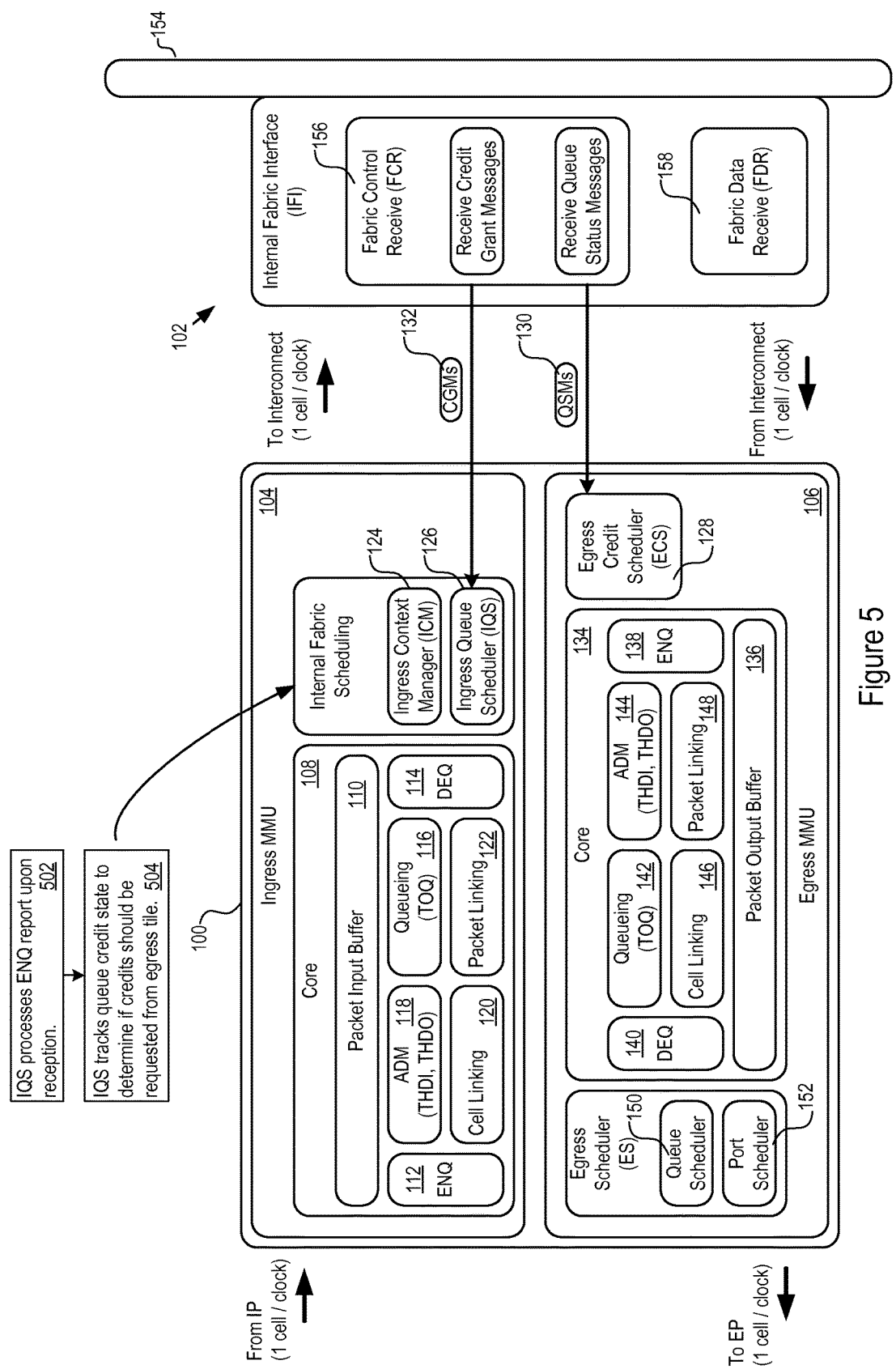
FIG. 5 continues the example shown in FIG. 4.

FIG. 5 continues the example shown in FIG. 4. The IQS circuitry 126 processes the enqueue report upon reception (502). The IQS circuitry 126 also tracks the queue credit state to determine if credits should be requested from an egress tile (504). The IQS circuitry 126 in the ingress tile 104 may, for instance, send a bandwidth credit request message report to the egress tile where the destination port resides that a given VoQ is ON or active, and that the VoQ should receive credits at a rate specified by a pre-configured QoS policy established through, e.g., a configuration interface. The IQS circuitry 126 in the ingress tile 104 may also send a bandwidth status update message to an egress tile that a given VoQ is OFF or inactive, indicating that the VoQ should stop receiving credits because the VoQ either has a credit surplus and/or no more data to transmit.

Figure 6:
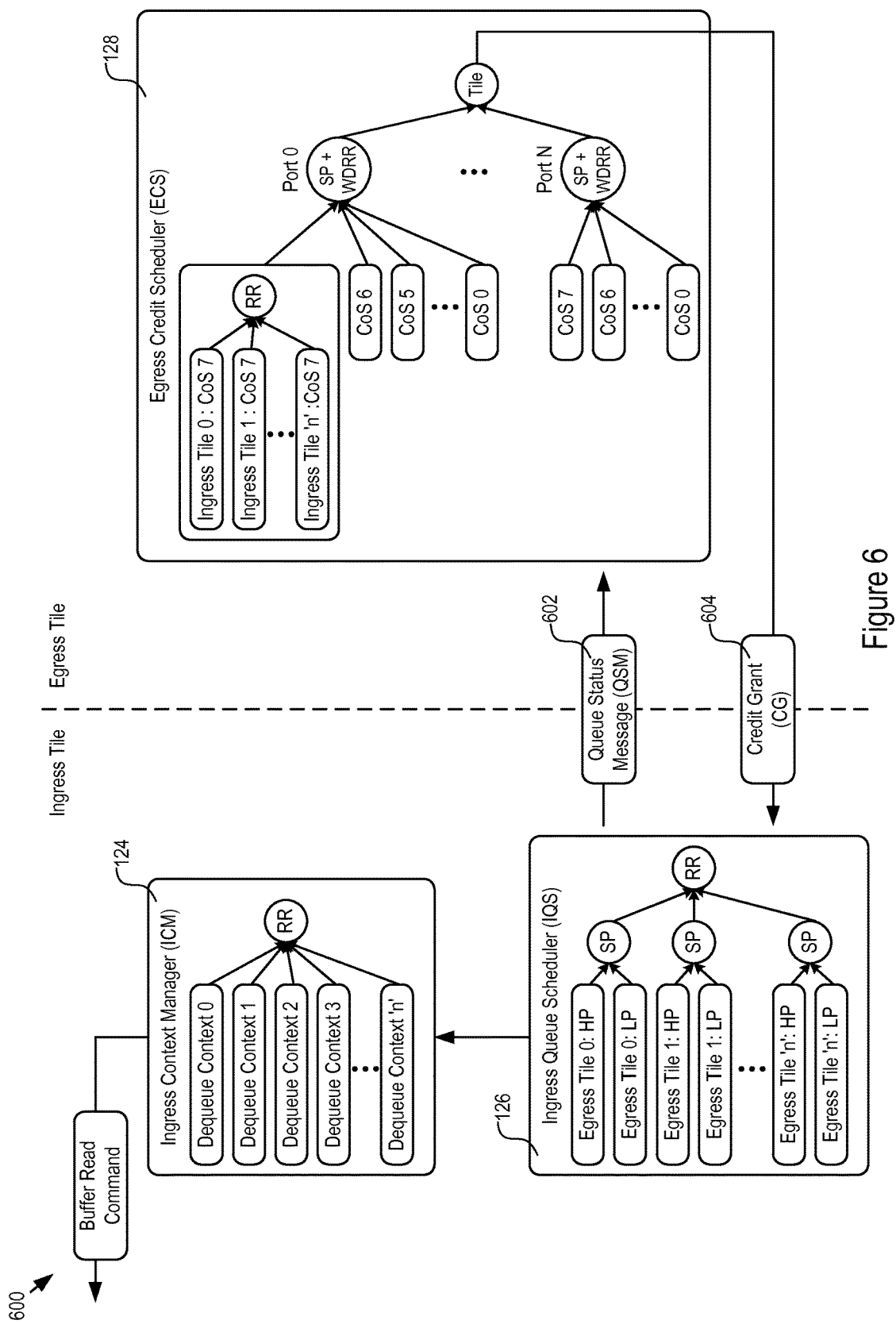
FIG. 6 continues the example of FIGS. 4 and 5.

FIG. 6 shows the interaction 600 between certain architecture elements and continues the example of FIGS. 4 and 5. When VoQs are active, the IQS circuitry 126 receives enqueue reports. The IQS circuitry 126 determines when to request bandwidth credits. To request bandwidth credits, the IQS circuitry 126 sends queue status messages 602 to the ECS 128. The ECS 128 allocates credits and returns bandwidth credit grant messages 604 back to the IQS circuitry 126.

Figure 7:
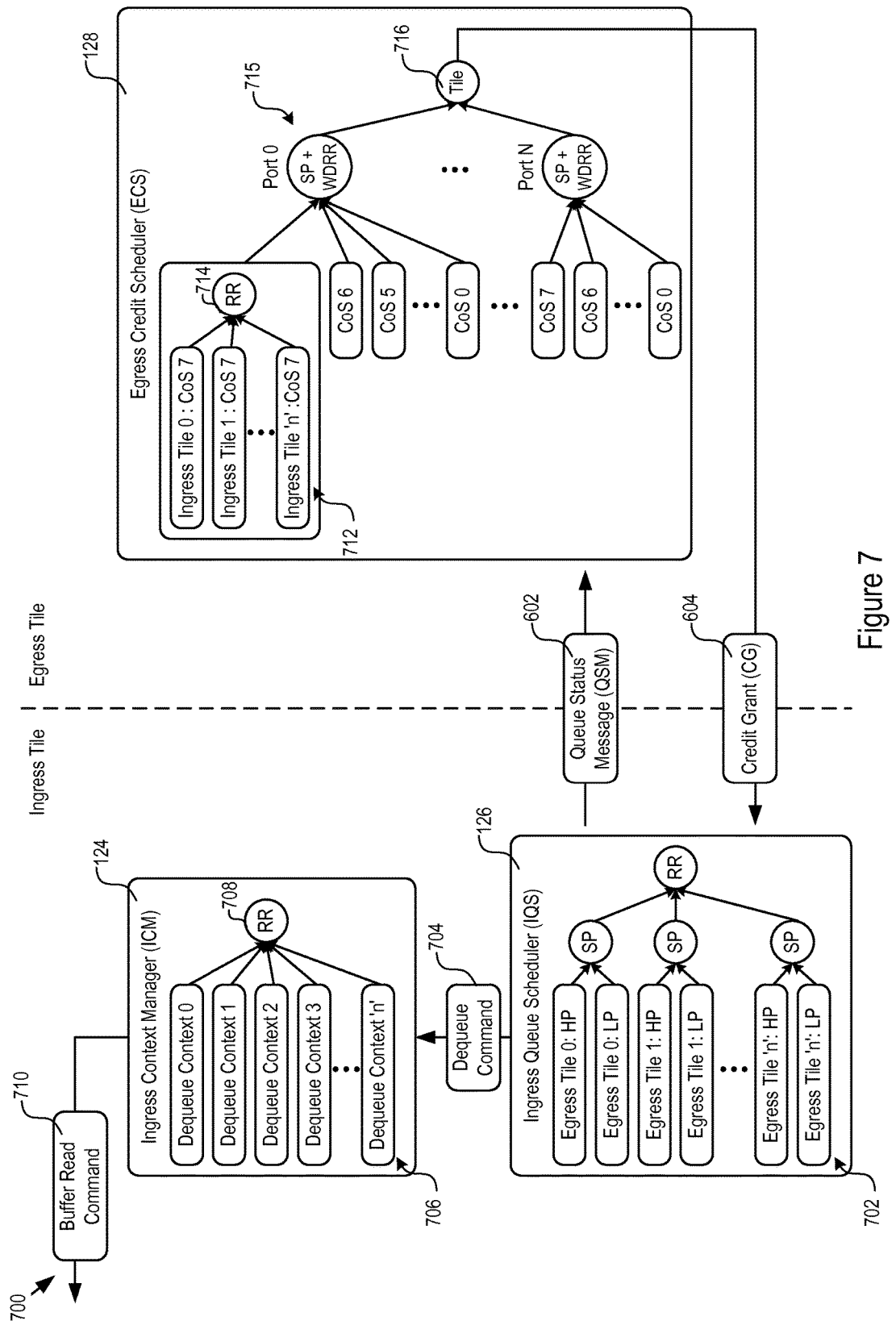
FIG. 7 continues the example of FIGS. 4-6.

FIG. 7 shows the interaction 700 between certain architecture elements and continues the example of FIGS. 4-6. In FIG. 7, the IQS circuitry 126 has received bandwidth credits, e.g., through the bandwidth credit grant message 604. The IQS circuitry 126 maintains a list 702 of VoQs that are eligible to use their credits, e.g., the VoQs that have received credits and have cells to transmit. The IQS circuitry 126 selects a queue and sends a dequeue command 704 to the ICM 124. The dequeue command 704 may specify, as examples, the queue and number of bytes of credit that may be dequeued from that queue.

As shown in FIG. 7, the ICM circuitry 124 maintains dequeue contexts 706 for any number 'n' of queues. A dequeue context is a representation of each VoQ that is transmitting from ingress to egress. The ICM circuitry 124 adds queues to the context responsive to the dequeue commands 704. In the ICM circuitry 124, a round-robin (RR) scheduler 708 selects the next VoQ to transmit, and keeps servicing that context for that VoQ until the ICM 124 has processed the number of bytes specified by the dequeue command 704 or until the EoP cell of the packet has been transmitted. In response to selecting the next queue to service, the ICM circuitry 124 sends buffer read commands 710 back to the ingress core 108 to cause retrieval of bytes from the specified queue from the input buffer 110 and transmission of those bytes to the switching fabric.

Note that the IQS circuitry 126 maintains a list 702 the VoQs that are eligible to transfer packets from an ingress tile to an egress tile. In one implementation, a VoQ is eligible is transfer packets when the VoQ is non-empty and the VoQ has received bandwidth credits. There may be multiple eligible VoQs in each ingress tile, with packets destined for any number of egress tiles. The IQS circuitry 126 may perform scheduling of each eligible VoQ for potential selection. In one implementation, the scheduling is a multiple factor scheduling: strict priority (SP) (e.g., to pick the higher priority packet over a lower priority packet), followed by RR selection. That is, the IQS circuitry 126 may maintain high priority (HP) queue lists and (relatively) lower priority (LP) queue lists, and select between them on a per-egress tile basis in a first round of scheduling. With strict priority selection, a HP packet is chosen over a LP packet. Then, RR scheduling as a second round selects among the packets chosen in the first round. The IQS circuitry 126 creates the dequeue command 704 to reflect the choice made as the result of the second round of scheduling.

In FIG. 7, the ECS 128 generates bandwidth credits for an entire tile. For instance, there may be 16 ports, each at 100 Gbps, for 1.6 Tbps of bandwidth. The ECS 128 would then generate 1.6 Tbps of bandwidth credits, distributed among 16 ports at 100 Gbps each. Optionally, the ECS 128 may generate credits at a rate faster than the theoretical maximum bandwidth. For instance, the ECS 128 may generate credits with 2% speedup (or according to any other configurable speedup parameter), e.g., at 102 Gbps per port instead of 100 Gpbs per port. The accelerated credit rate may help address that the credit issuance algorithm is approximate, in that the algorithm does not know exactly how many bytes of a credit grant will be consumed. In some instances, only partial amounts of a given credit grant are consumed, e.g., because the EoP cell was reached before running out of bandwidth credit. Essentially, the accelerated credit rate effects delivery of unused bandwidth credit to VoQs with cells to transfer. As shown in FIG. 7, the ECS 128 may maintain class of service (CoS) lists on a per-ingress tile basis for each output port, e.g., the CoS list 712. That is, each port may have multiple different CoSs, and each CoS could have multiple VoQs trying to send on that same CoS. The RR schedulers (e.g., the RR scheduler 714) in the ECS 128 select, as a first stage of selection, between the ingress tiles for a given CoS for a given output port.

The ECS 128 may select between the different CoSs for each port with a second stage of selection. The second stage of selection may be a SP and weighted distributed RR (WDRR) stage (SP+WDRR) 715. For instance, when CoSs for a given port have been given different priorities, SP may give precedence to the highest priority CoSs. Then, WDRR may select according to weights assigned to the queues, any number of which may have the same priority. That is, the SP+WDRR stage honors weight assignments to distribute bandwidth credits in proportion to the assigned weights, while giving strict precedence according to priority when different priority CoSs for a given output port are competing for bandwidth. Note, however, that selection mechanisms other than SP+WDRR may be implemented, including SP only, WDRR only, other types of RR, and other types of cell schedulers in general. Accordingly, each of the schedulers in the switch architecture may be implemented with selection mechanisms other than those shown, and thus the switch architecture design may vary widely depending on the desired implementation.

As a specific example, assume there are 8 CoS queues (CoS 1-8) for a port. CoS 8 and CoS 7 are SP queues and the remaining CoSs (CoS 1-6) are lower priority queues each with a pre-configured weight. In this case, the ECS 128 scheduler will first pick CoS 8 if it is non-empty. If CoS 8 is empty, the scheduler picks CoS 7 if it is non-empty. Only when both COS 8 and COS 7 are empty will the scheduler pick from among CoS 1-6, and then in a ratio according to their configured weights.

The tile scheduler 716 implements a third stage in the ECS 128. The tile scheduler 716 arbitrates credit allocation among the ports of a given egress tile. The tile scheduler 716 will allocate, overall, bandwidth credits to meet the configured port rate of each port. Said another way, the tile scheduler 716 may allocate credits responsive to a fixed weight for each port. To do so, the scheduler 716 may maintain a calendar with port entries that are populated to specify credit grants to the ports to meet their port rates, e.g., a 100 Gbps port may have twice as many calendar entries as a 50 Gbps port, with the ECS 128 generating a fixed number of bandwidth credits per calendar entry.

Figure 8:
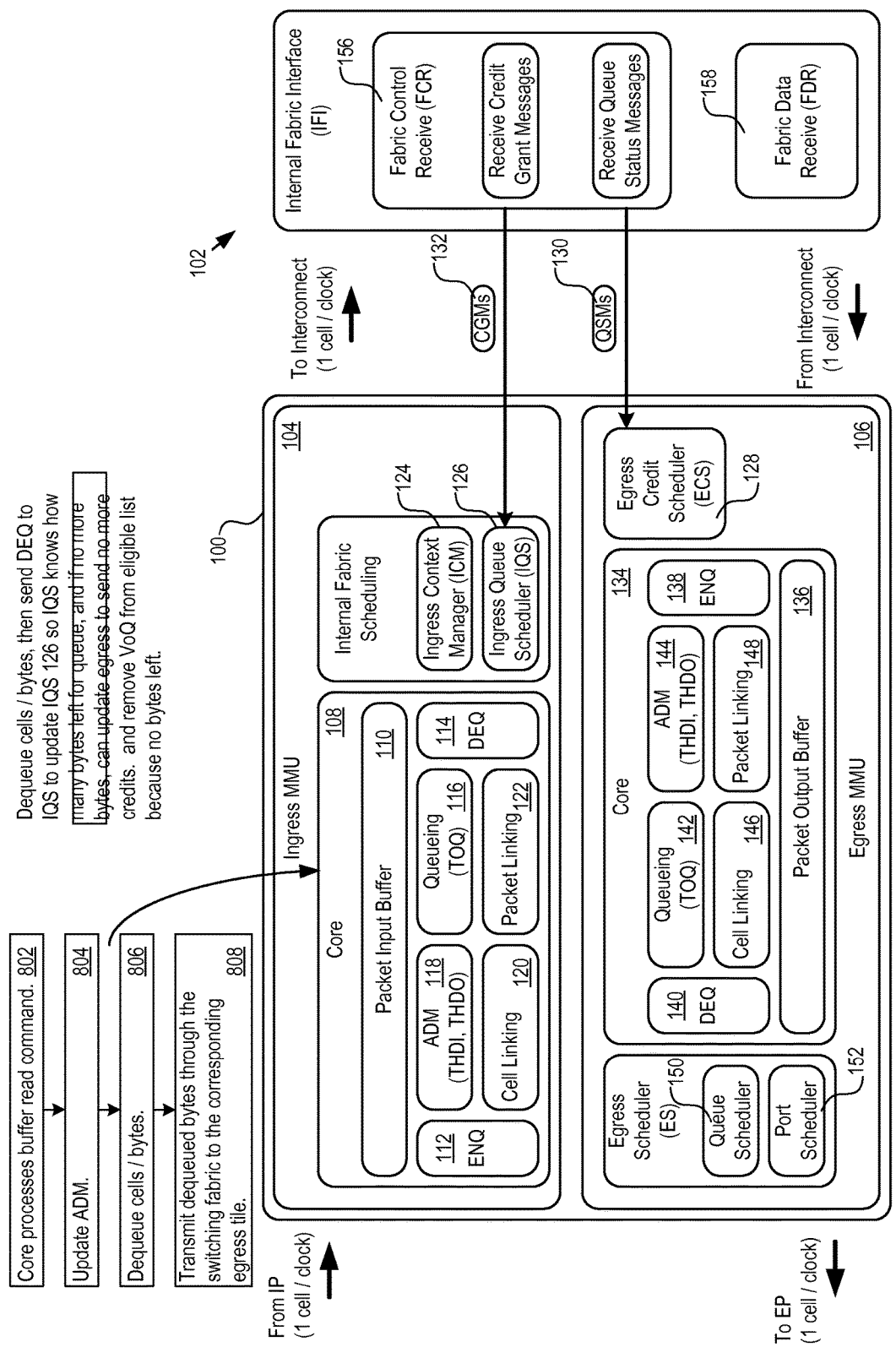
FIG. 8 continues the example of FIGS. 4-7.

FIG. 8 continues the example above and shows that the ingress core 108 processes the buffer read command 710 (802). In that regard, the ADM circuitry updates its tracking of the queues being serviced for the purposes of admissions control (804). The ingress core 108, e.g., via the dequeue circuitry 114, dequeues the cells/bytes specified in the buffer read command 710 (806). The dequeue circuitry 114 passes the dequeued bytes to the switching fabric for transmission to the appropriate egress tile (808).

Figure 9:
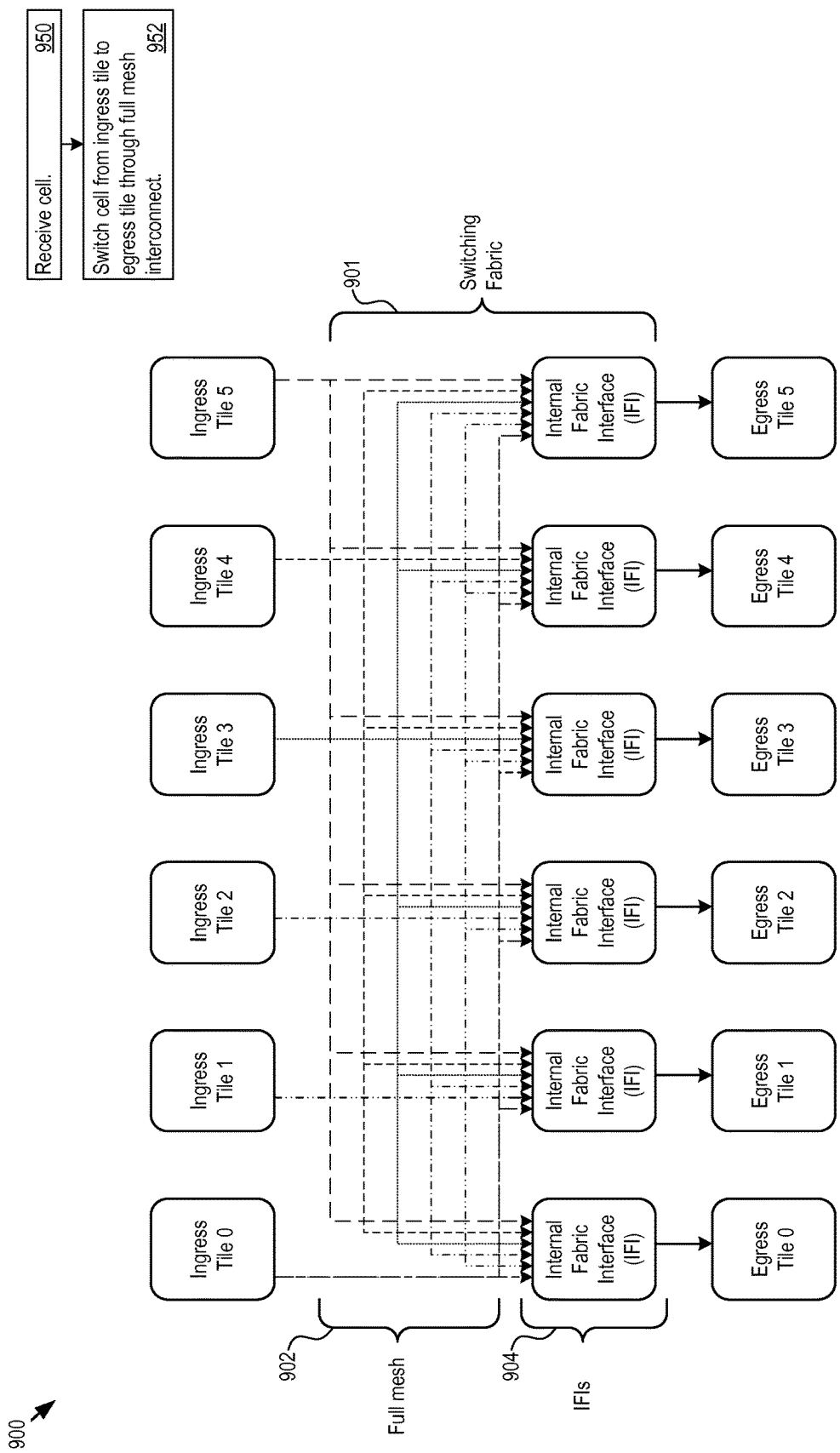
FIG. 9 shows the switching fabric.

FIG. 9 shows a view 900 of the switching fabric 901 with a full mesh interconnect 902. In FIG. 9, the switching fabric 901 receives a cell (950). The switching fabric 901 switches the cell to the corresponding egress tile via the full mesh interconnect 902 (952). The switching fabric 901 may include the full mesh interconnect 902 and any number of IFIs 904. Each IFI 904 includes an FCR and an FDR (see, e.g., FIG. 1).

Figure 10:
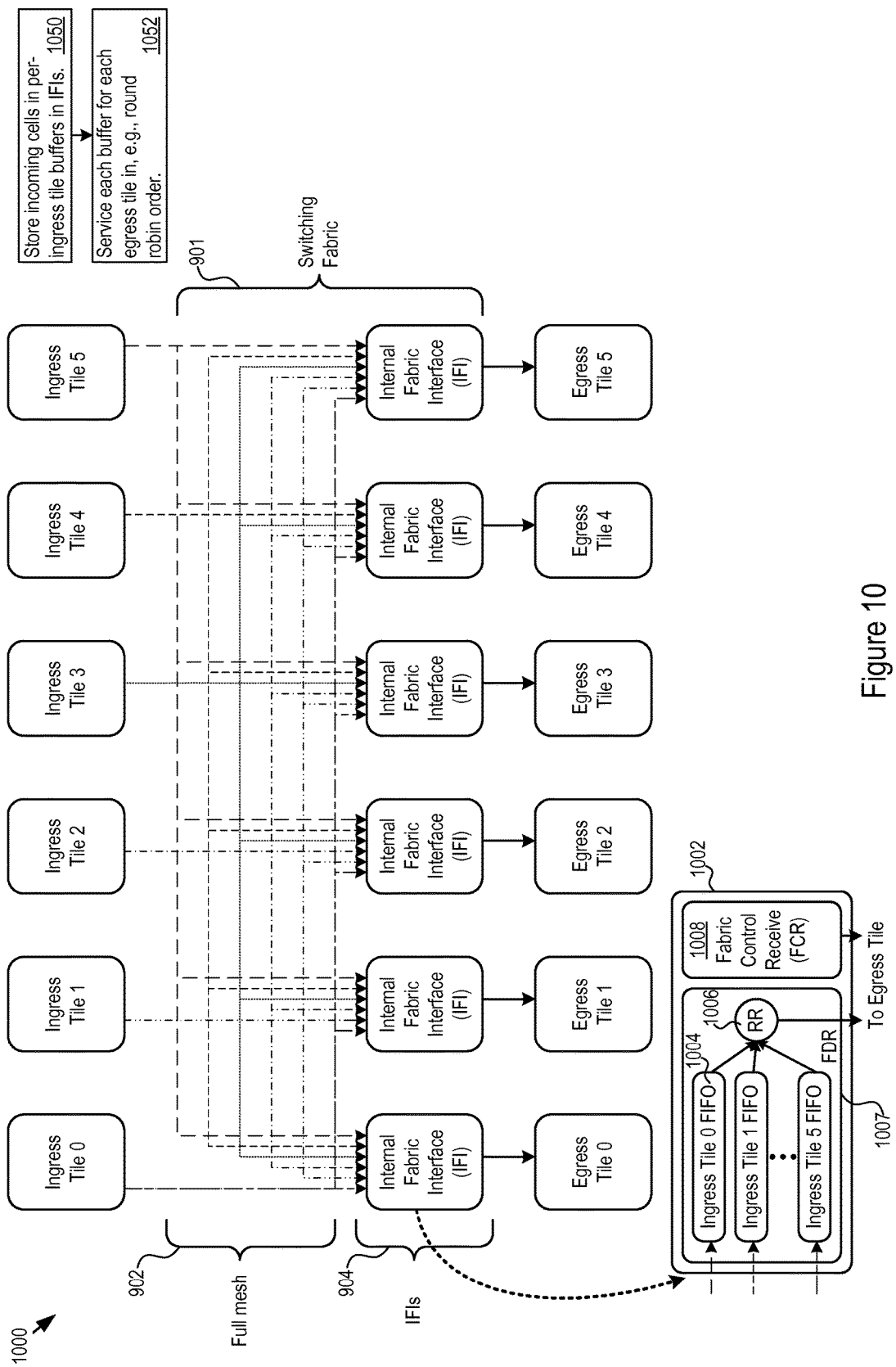
FIG. 10 shows additional details of the switching fabric.

FIG. 10 shows another view 1000 of the switching fabric 901. FIG. 10 shows that the switching fabric 901 is another distributed buffer point for the switch architecture. Ingress tiles connect through the full mesh 902 and internal fabric interfaces (IFIs) 1002 to egress tiles. Each IFI 1002 includes an FDR 1007 and an FCR 1008. For cell data, for each egress tile, the IFIs include fabric buffers 1004 in the FDR 1007. The fabric buffers 1004 may be, e.g., interconnect transmit FIFOs assigned to each ingress tile. A RR scheduler 1006 may select between the fabric buffers 1004 to choose the next cell to forward to the egress tile connected to that IFI. As noted above, control signals may pass between circuitry in the switch architecture over a separate control paths in the FCR 1008, e.g., signal paths distinct from the paths that the data cells traverse through the switch fabric.

Stated another way, the switching fabric 901 itself stores incoming cells in buffers, e.g., in first-in-first-out (FIFO) memories (1050). More specifically, the switching fabric 901 may store the incoming cells in per-ingress tile data FIFOs. The buffering facilitates contention resolution when more than one cell is destined for a given egress tile at the same time. If the a buffer fill level exceeds a pre-defined suspend threshold, the switching fabric 901 may send flow control messages back to the ingress tiles to request that the ingress tiles suspend cell transmission. The suspension may continue until, e.g., the switching fabric 901 sends a resumption message when the buffer level falls below a pre-determined resumption threshold. Each FIFO may support, as just one implementation example, one write and one read per clock cycle. In addition, a scheduler services each switching fabric transmit FIFOs for each egress tile in, e.g., round robin order at, e.g., a rate of 1 cell per clock (1052).

Figure 11:
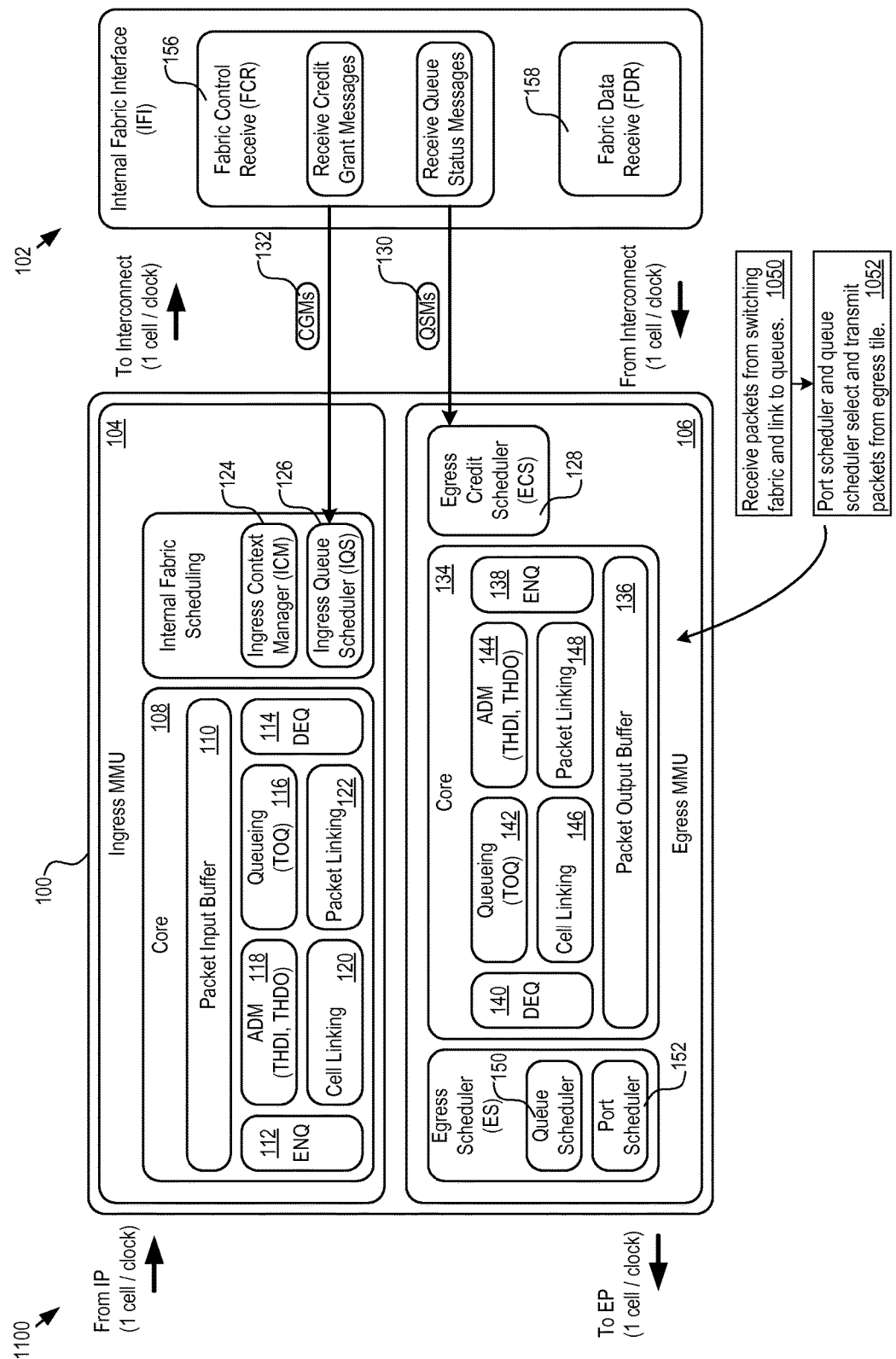
FIG. 11 shows an example of egress tile processing for store and forward flow.

FIG. 11 shows an example 1100 of egress tile processing for the SAF flow example begun above. In FIG. 11, the cells for a packet are received from the switching fabric 901, and the packet linking circuitry 148 and cell linking circuitry 146 link the packets to specific queues defined in the output buffer 136. The queue scheduling circuitry 150 and port scheduling circuitry 152 control queue and port selection for transmission. These schedulers also control packet dequeue from the output buffer 136, and transmission of the packet through the selected output port. In more detail, the queue scheduling circuitry 150 and port scheduling circuitry 152 perform functions that respectively parallel the SP+WDRR scheduler 715 and the tile scheduler 716 in the ECS 128.

Note that in the example discussed above in FIGS. 4-11, the flow model was SAF. That is, on the ingress side, packet cells are not transferred through the switching fabric 901 until an entire packet has been received at the ingress tile. Similarly, on the egress side, packet cells are not transmitted out of a port until an entire packet has been received at the egress tile.

Figure 12:
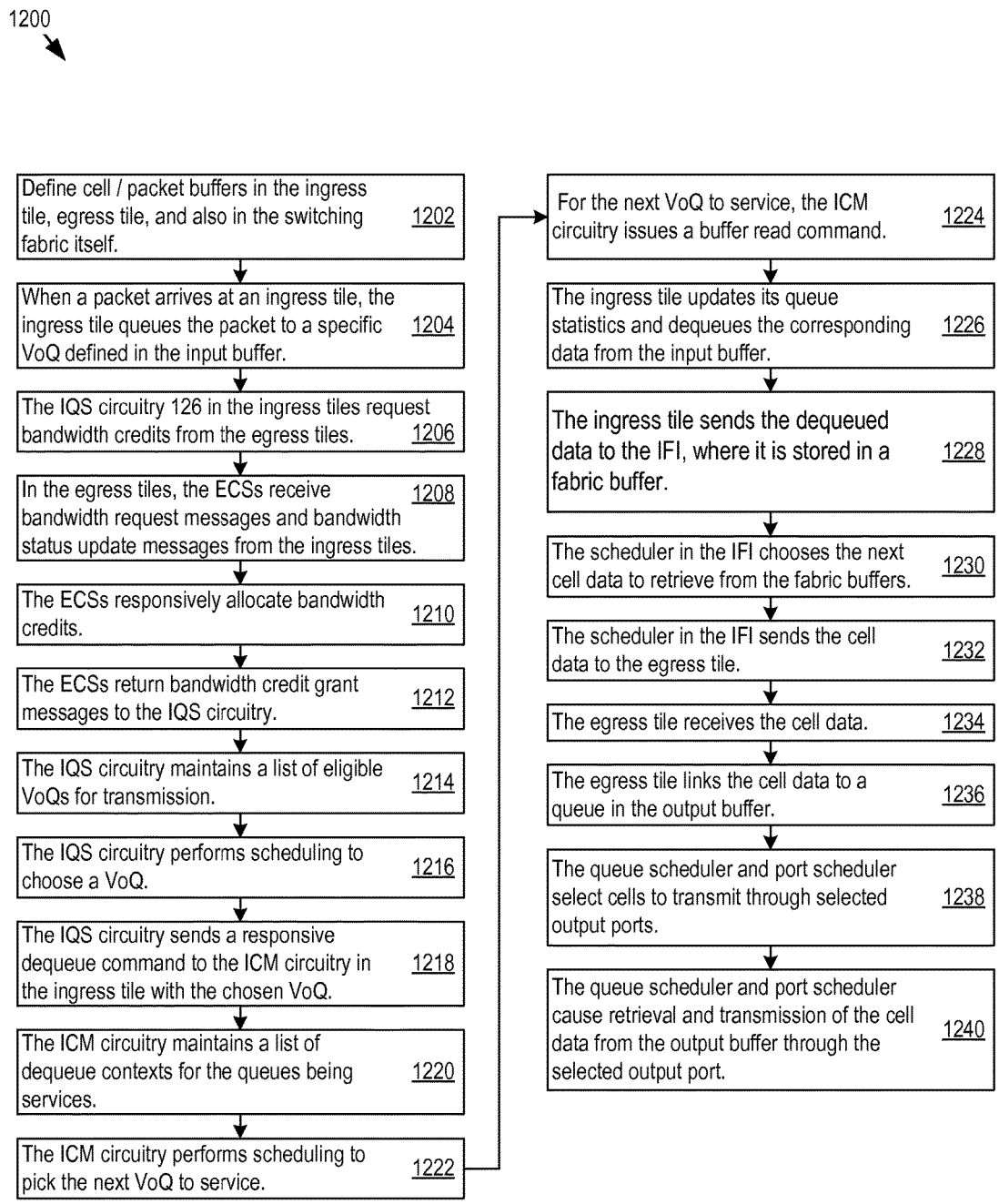
FIG. 12 shows logic that may be implemented in a switch architecture.

The switching architecture described above provides a combined input/output queueing architecture. FIG. 12 shows logic that may be implemented in the switching architecture. Packet buffers are defined in the ingress tile, egress tile, and also in the switching fabric itself (1202). When a packet arrives at an ingress tile, the ingress tile queues the packet to a specific VoQ defined in the input buffer 110 (1204).

The IQS circuitry 126 in the ingress tiles request bandwidth credits from the egress tiles (1206). In the egress tiles, the ECSs 128 receive bandwidth request messages and bandwidth status update messages 602 from the ingress tiles (1208). The ECSs 128 responsively allocate bandwidth credits (1210) and return bandwidth credit grant messages 604 to the IQS circuitry 126 (1212).

The IQS circuitry 126 maintains a list of eligible VoQs for transmission (1214). The IQS circuitry 126 performs scheduling to choose a VoQ (1216) and sends a responsive dequeue command 704 to the ICM circuitry 124 in the ingress tile with the chosen VoQ (1218). The ICM circuitry 124 maintains a list of dequeue contexts for the queues being services (1220) and performs scheduling to pick the next VoQ to service (1222).

For the next VoQ to service, the ICM circuitry 124 issues a buffer read command 710 (1224). The ingress tile updates its queue statistics and dequeues the corresponding data from the input buffer 110 (1226), responsive to the buffer read command. The ingress tile sends the dequeued data to the IFI, where it is stored in a fabric buffer (1228). The scheduler in the IFI chooses the next cell data to retrieve from the fabric buffers (1230), and sends the cell data to the egress tile (1232). The egress tile receives the cell data (1234), and links the cell data to a queue in the output buffer 136 (1236). The queue scheduling circuitry 150 and port scheduling circuitry 152 select cells to transmit through selected output ports (1238) and cause retrieval and transmission of the cell data from the output buffer 136 through the selected output port (1240). All of the processing noted above may be performed in a replicated tile architecture fabricated on a single chip. The single chip solution provides extremely high levels of integration and very low latency, to support terabit range data rates.

The distributed buffering switching architecture supports other modes of transmission, including cut-through, when specific pre-defined conditions are met. With cut through, cells of incoming packets to an ingress tile may immediately begin to flow through the switching fabric 901 to the egress tile. Similarly, cells of outgoing packets may be transmitted out of an output port prior to complete reception of the outgoing packet in the egress tile. However, in some implementations, the egress tile may hold a SoP CT cell under specific conditions are met prior to transmitting the SoP cell out of the output port. For instance, the egress tile may hold the SoP cell until at least a threshold number of additional cells for the packet have arrived at the egress tile. Doing so may help avoid underrun conditions on the output port. Further details of cut through operation are provided below.

Figure 13:
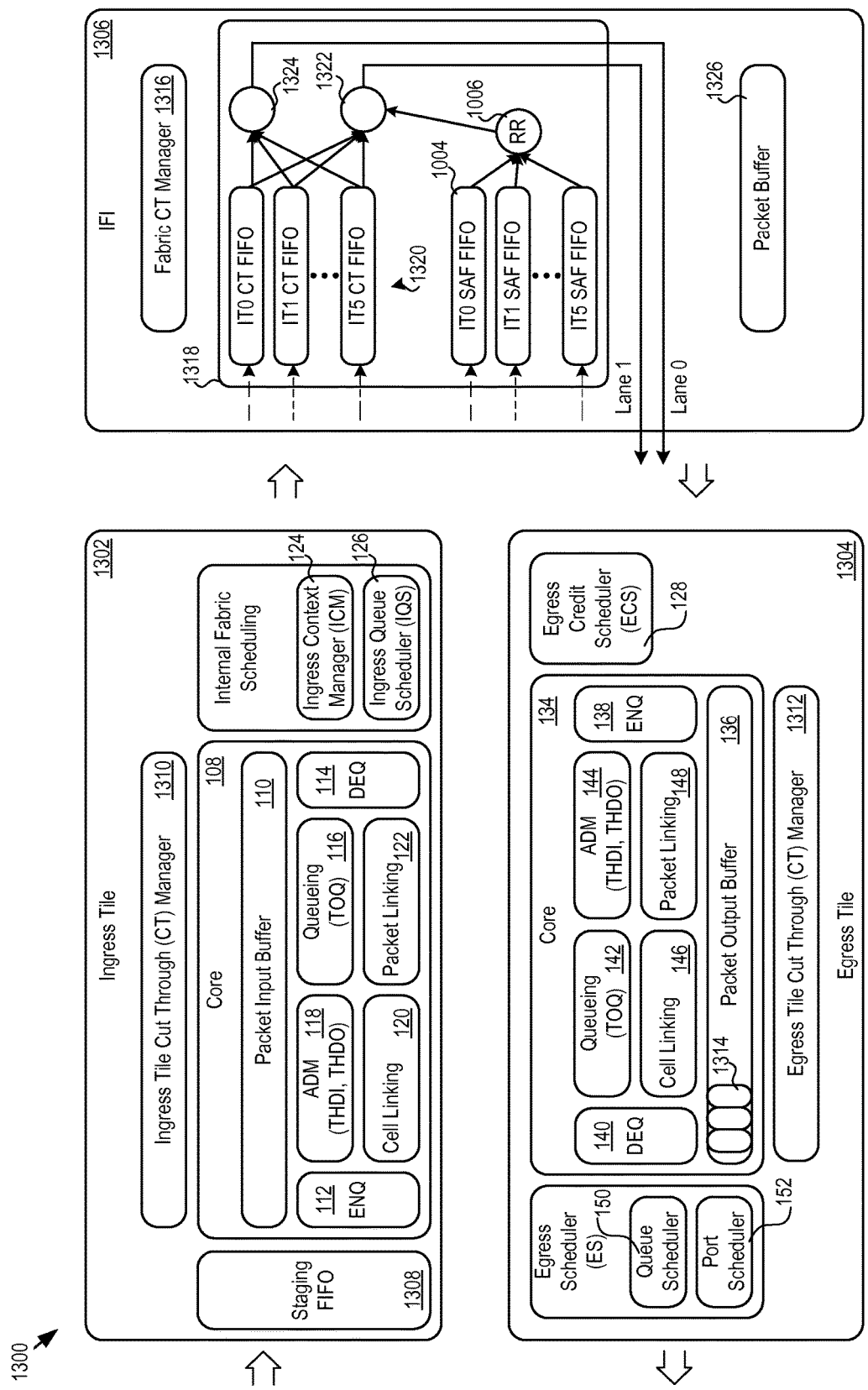

FIG. 13 shows a distributed buffering switch architecture 1300 that supports cut through (CT). The switch architecture 1300 includes an ingress tile 1302, an egress tile 1304, and an IFI 1306. The ingress tile 1302 includes a staging buffer 1308, e.g., a staging FIFO, and an ingress tile CT manager 1310. The egress tile includes an egress tile CT manager 1312, and per-port CT buffers 1314, e.g., per-port CT FIFOs. Note that the per-port CT buffers 1314 may store the cell payloads themselves, or the per-port CT buffers 1314 may store pointers to cell payloads stored in the output buffer 136. The IFI 1306 includes a fabric CT manager 1316 and buffering circuitry 1318.

The buffering circuitry 1318 includes per-ingress tile SAF fabric buffers 1004 (see FIG. 10), as well as per-ingress tile CT buffers 1320. The buffers 1004 and 1320 may store SAF cells and CT cells, respectively. However, this is just one way to organize the memory system, and other options may be implemented. For instance, SAF and CT cell payload data may be stored in the packet buffer 1326, and the SAF fabric buffers 1004 and the CT buffers 1320 may implement queues that store pointers to the cell payloads in the packet buffer 1326. The RR scheduler 1006 selects between the SAF buffers 1004 as described above. Note, however, that the buffering circuitry 1318 defines multiple lanes of data output: Lane 0 and Lane 1. The buffering circuitry 1318 is capable of outputting two cells per clock, one on each of Lane 0 and Lane 1. Lane 1 may output either a SAF cell or a CT cell, as selected by the cell scheduler 1322. Lane 0 is reserved for CT cells, as selected by the cell scheduler 1324. The two output lanes provide extra bandwidth capacity through the IFI 1306, in particular double the bandwidth for CT cells. Providing multiple lanes out of the IFI 1306 yields speedup for CT flows. Lane 0 and Lane 1 allow dequeue of two cells per clock from the IFI 1306. This speedup helps avoid queue buildup in the switching fabric. The output buffer 136 may, correspondingly, have multiple (e.g., one for each lane) write ports to accept the multiple cells per clock arriving from the switching fabric on each clock.

The egress tile CT manager 1312 handles the CT cells received from the switching fabric. In particular, the egress tile CT manager directs CT cells into the per-port CT buffers 1314. The port scheduling circuitry 152 directs the dequeue of CT cells from the per-port CT buffers 1314 and transmission of the CT cells out through the output ports.

The CT mode allows the switch architecture 1300 to bypass entire packet buffering at both the ingress tile 1302 and egress tile 1304. When pre-determined conditions are met, the ingress tile CT manager 1310 and egress tile CT manager 1312 coordinate to allow individual packet cells to flow from the ingress tile 1302 to the egress tile 1304 without waiting for the entire packet to which the cell belongs to arrive and to be queued in the input buffer 110 (upon reception) and the output buffer 136 (for transmission).

Figure 14:
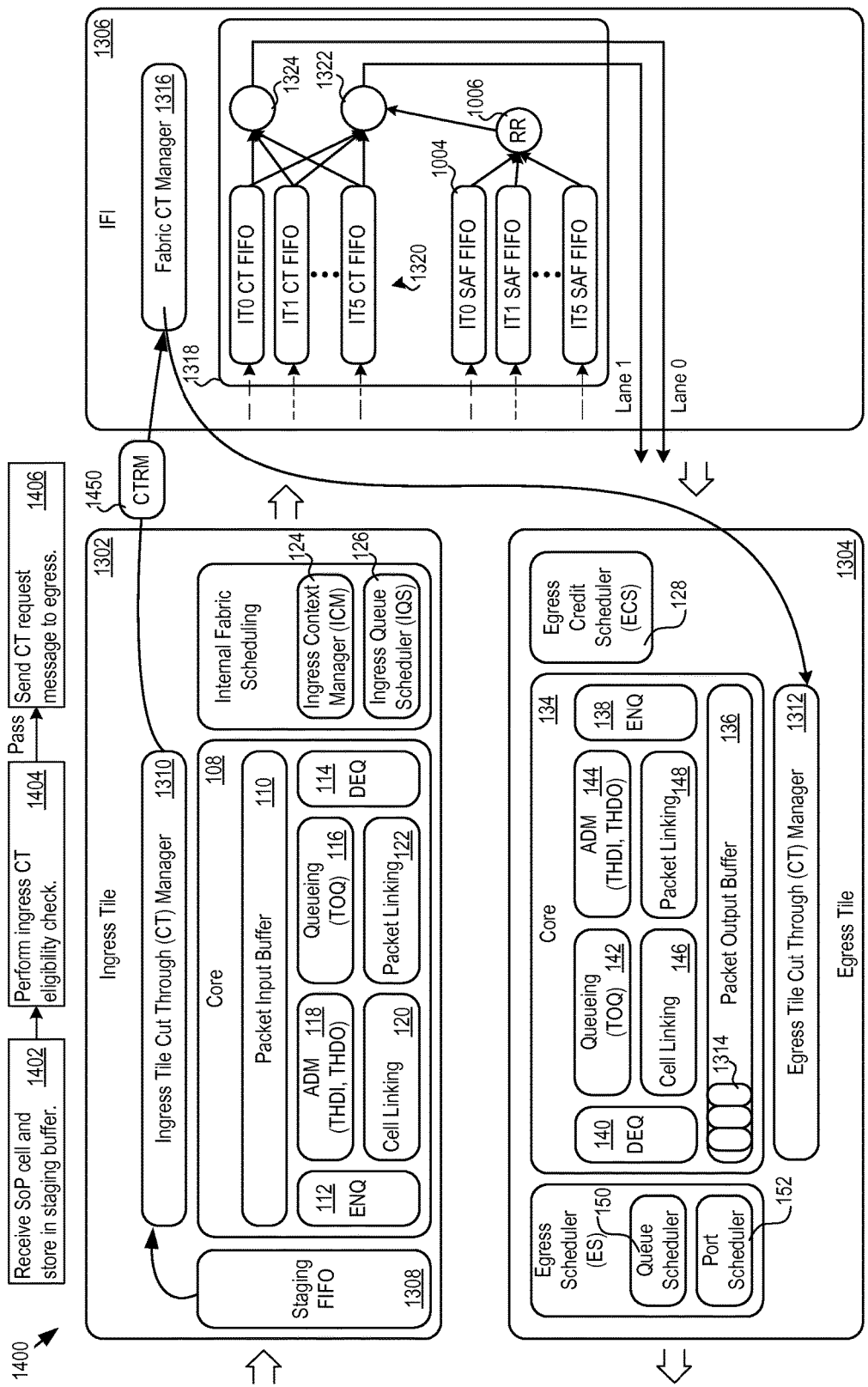
FIGS. 14-18 show an example of cut through for SoP, MoP and EoP cells.

FIG. 14 shows progress 1400 of a start of packet (SoP) cell using CT. The SoP cell arrives and is stored in the staging buffer 1308 (1402) at the ingress tile 1302. The ingress tile CT manager 1310 performs a local (ingress side) CT eligibility check for the packet associated with the SoP cell (1404). In one implementation, the local eligibility check includes whether the input buffer 110 already contains packets destined for the same output port as the received CT cell. If so, the CT cell is not eligible, because other packets are already awaiting transfer to that output port. If the CT eligibility check passes, the ingress tile CT manager 1310 sends a CT request message 1450 to the destination egress tile for the packet (1406). Note that a status bit in the CT request message 1450 may indicate whether the received cell is a single cell packet (i.e., the packet fits within a single cell). The CT request message 1450 may flow through the IFI 1306 over a dedicated control path, like the queue status and credit grant messages discussed above. The dedicated control path provides a very low latency control channel that facilitates coordination of the difficult operation of CT flow in a switching architecture with multiple buffering points.

Figure 15:
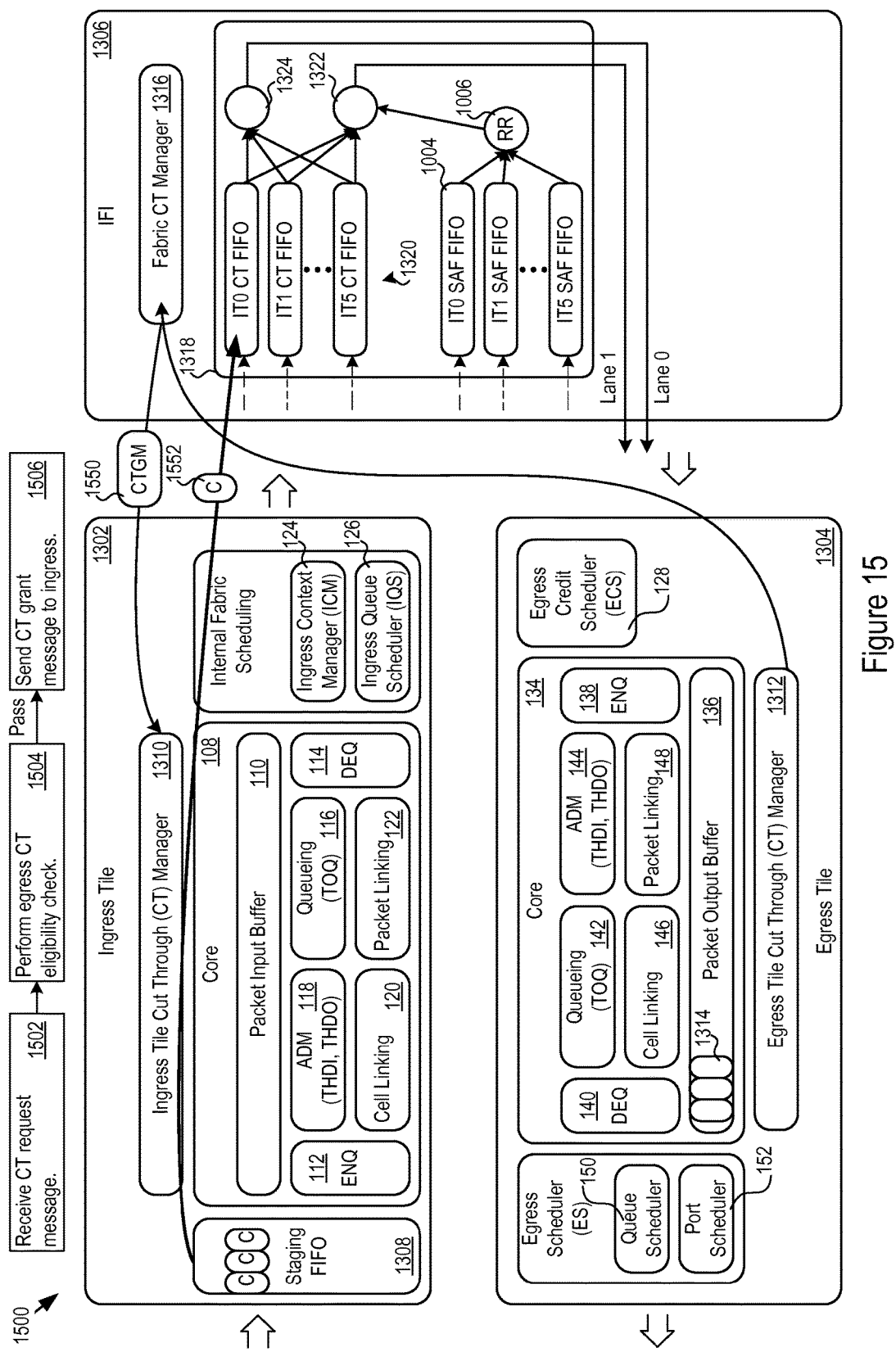

FIG. 15 shows additional progress 1500 of processing the CT cell using the example of FIG. 14. The egress tile CT manager 1312 receives the CT request message (1502) and performs a local (egress side) CT eligibility check (1504). In that regard, the egress tile CT manager 1312 (in the various egress tiles) receive CT request messages from potentially many ingress tiles for a given output port. The egress tile CT manager 1312 decides, based on output port state, whether to grant or deny the CT request. For instance, the egress tile CT manager 1312 may deny the CT request when the output buffer 136 at that egress tile already has packets queued up for that output port. Additionally, the egress tile CT manager may deny the CT request when there are multiple ingress tiles requesting the same output port for CT. Further, the CT manager 1312 may check the status of the IFI 1306 to make CT decisions. For instance, an FDR may send a map to its egress tile (e.g., the bitmap FDR_Empty_Bitmap referenced below). The map may specify whether any of the cells queued in the IFI 1306 are destined for any of the egress tile ports. The CT manager 1312 may deny CT when the IFI 1306 already has a queued cell destined for a port that is also the destination of a cell requesting CT. That is, a newly arrived SoP cell may not be allowed to cut ahead of a cell already waiting to use the same output port. Note that the egress tile CT manager 1312 is present in each egress tile, and maintains a global view of the requests made by all of the ingress tiles. However, the global view may only be with respect to the output ports associated with that particular egress tile. That is, a given egress tile CT manager 1312 makes CT decisions for the output ports for that egress tile, and the decision is a joint decision with the requesting ingress tile. Additional or different checks may be performed by the CT managers other that those described above on the ingress side and the egress side. If the egress side CT eligibility check passes, then the egress tile CT manager 1312 may return a CT grant message 1550 back to the ingress tile CT manager 1310.

The CT cell reaches the head of the staging buffer 1308. If CT has been granted, then the CT cell obtains priority access to the switching fabric. The CT cell 1552 traverses the switching fabric and is stored in a CT buffer 1320. In other words, the CT cell 1552 bypasses the input buffer 110 and flows directly to the egress tile through the switching fabric. CT cells have higher priority access to the switching fabric. For that reason, the ingress tile CT manager 1310 may also implement starvation avoidance to prevent regular CT flows from preventing buffered SAF packet data from reaching egress tiles. For instance, the ingress tile CT manager 1310 may monitor the rate of SAF cells out of the ingress tile and the rate of CT cells out of the ingress tile over pre-determined time windows, e.g., windows of 1000 clocks. When the rate of SAF cells falls below a pre-determined stop-CT threshold (or any other starvation condition is met), the ingress tile CT manager 1310 may stop CT for new packets out of its ingress tile. The ingress tile CT manager 1310 may stop CT for a specified duration, e.g., until the starvation condition alleviates (for instance, when the rate of SAF cells exceeds a resume-CT threshold).

Figure 16:
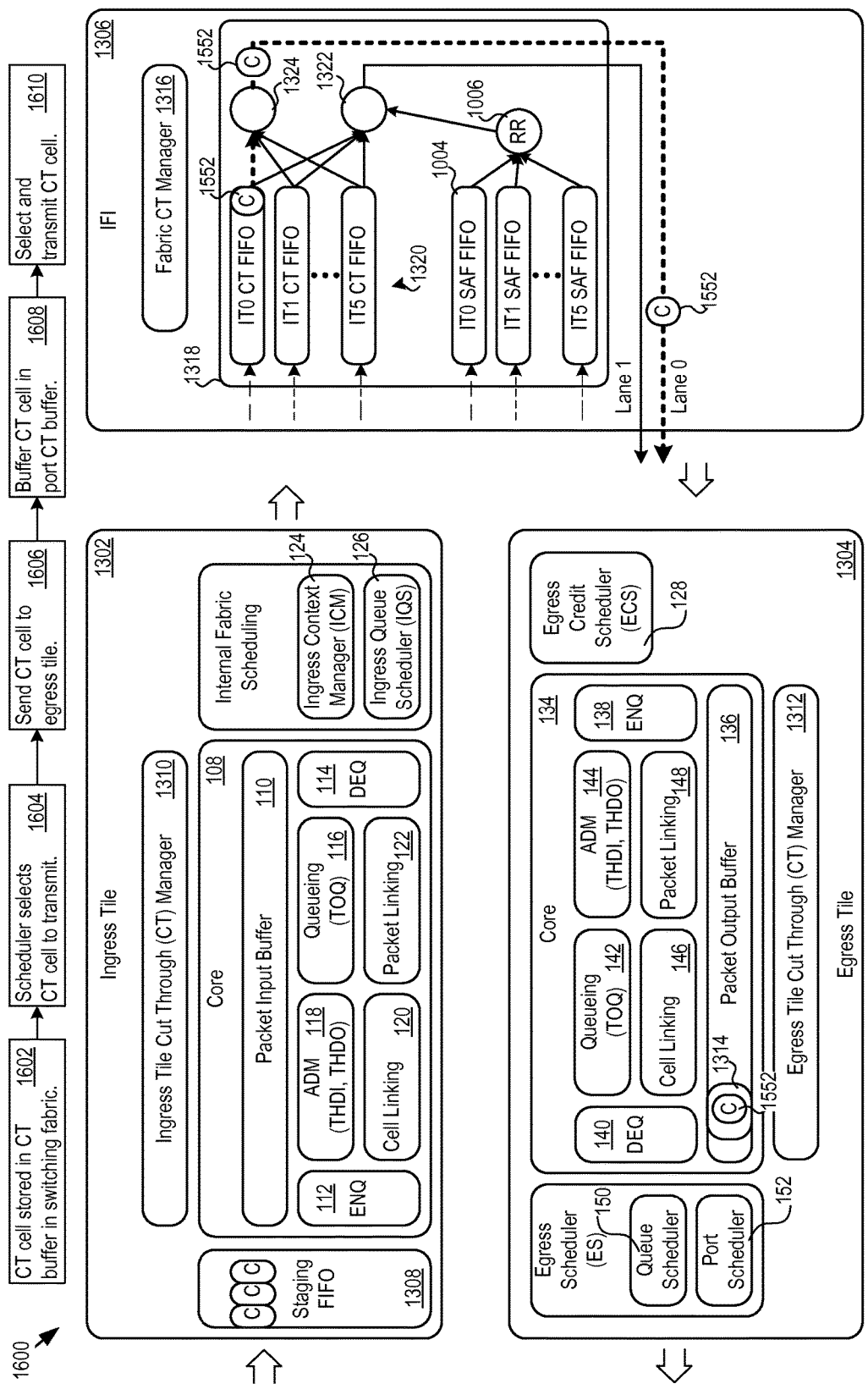

FIG. 16 shows additional progress 1600 of processing the CT cell using the example of FIGS. 14 and 15. The CT cell 1552 arrives in a CT buffer 1320 (1602). Note that the scheduler 1322 that drives Lane 1 is shared by the SAF path and the CT path in the buffering circuitry 1318. The scheduler 1322 gives precedence to CT cells and preferentially selects them for transfer to the egress tile when they are available. Among multiple buffered CT cells, the schedulers 1322 and 1324 may implement RR selection, for example. In the example of FIG. 16, the CT cell 1552 flows through the CT buffer (1604), is selected by the scheduler 1324, and is sent to the egress tile 1304 (1606) over Lane 0. The CT cell 1552 is stored in the corresponding per-output port CT buffer 1314 (1608), and the port scheduling circuitry 152 selects the CT cell 1552 for transmission out through the output port (1610).

Figure 17:
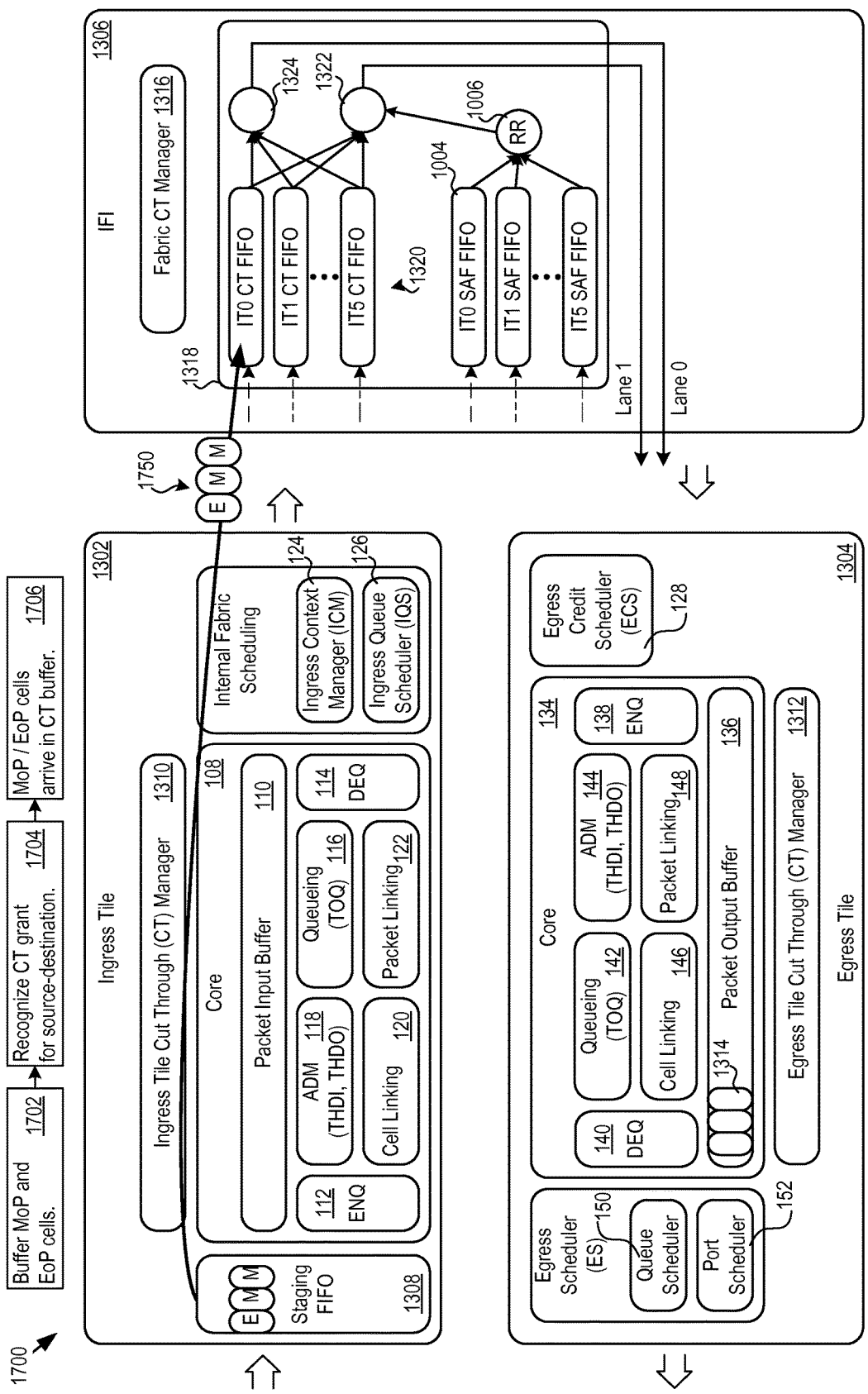

Packets that exceed one cell in length will have an end of packet (EoP) cell and potentially zero or more middle of packet (MoP) cells. FIG. 17 shows processing 1700 of MoP/EoP 1750 cells that follow the SoP. In FIG. 17, the MoP/EoP cells 1750 arrive at the staging buffer 1308 (1702). If the cell is an EoP cell, the ingress tile CT manager may send an end of CT message to the outgoing egress tile if the corresponding packet has been granted CT or that packet has an outstanding CT request. When the MoP/EoP cells reach the head of the staging buffer 1308, the ingress tile CT manager 1310 recognizes an active CT flow for the source-destination port pair (1704) if CT has been granted. In response, the MoP/EoP cells 1750 have priority access to the switching fabric, and the MoP/EoP cells 1750 traverse the switching fabric and arrive in a CT buffer 1320 (1706).

Figure 18:
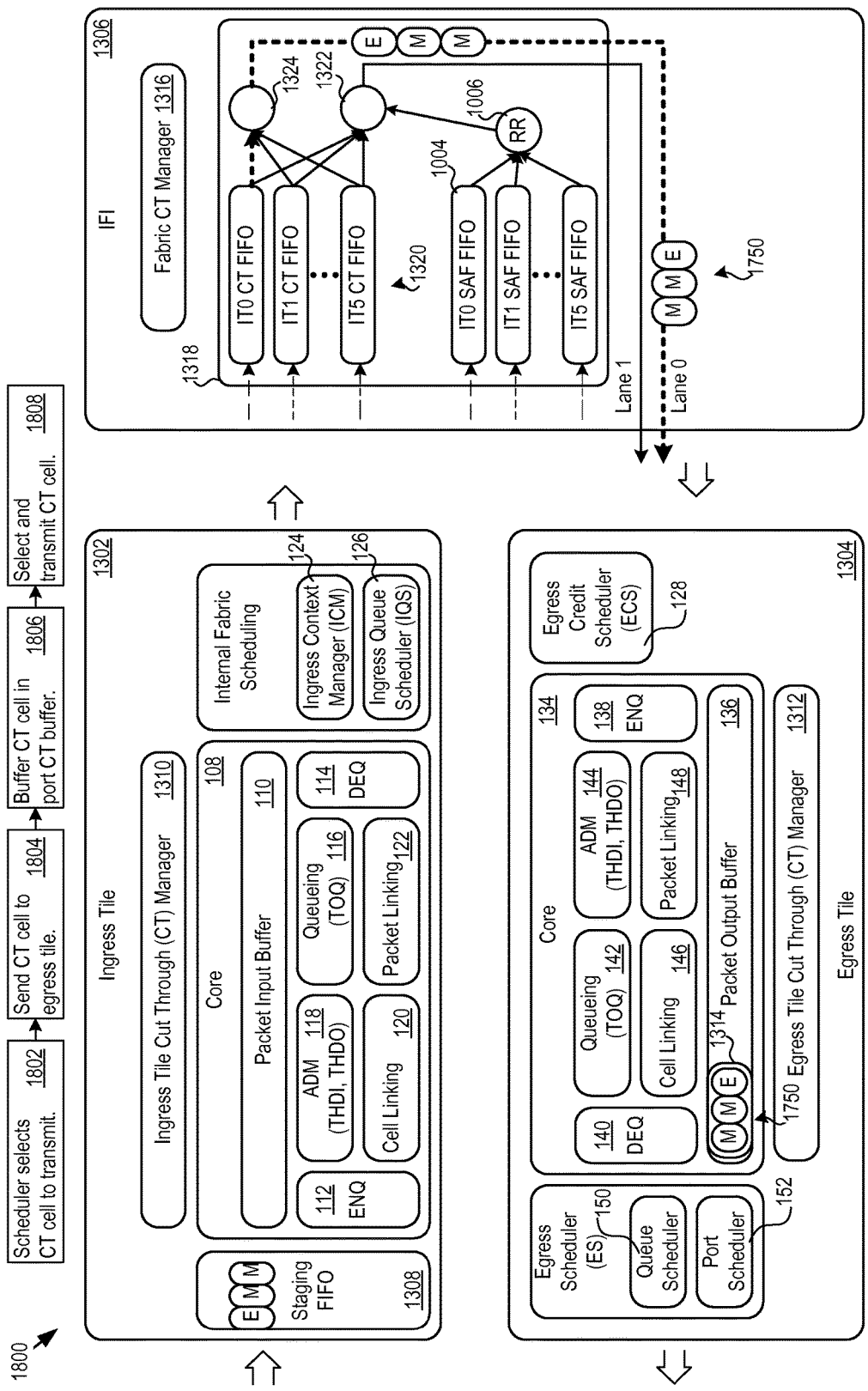

FIG. 18 shows further processing 1800 of the MoP/EoP cells 1750 that follow the SoP. In FIG. 18, the MoP/EoP cells 1750 receive priority selection out of the buffer circuitry 1318, in this example over Lane 0 (1802). The scheduler 1324 sends the MoP/EoP cells 1750 to the egress tile 1304 (1804). The MoP/EoP cells 1750 are stored in the corresponding per-output port CT buffer 1314 (1806), and the port scheduling circuitry 152 selects the MoP/EoP cells 1750 in sequence for transmission out through the output port (1808).

In some implementations, the staging buffer 1308 stores cell pointers, and the cell payload is stored in the input buffer 110. In that respect, a fixed portion of the input buffer 110 which can store as many cells as the depth of the staging buffer 1308 is reserved for that purpose. The staging buffer 1308 may be a fixed-delay element. That is, each incoming cell may wait for a fixed number of clock cycles in this buffer. This delay may be based on a worst-case round-trip delay between a CT request being sent out by an ingress tile, and a corresponding CT response (grant or denial) coming back from the egress tile. All packets may proceed through the staging buffer 1308 irrespective of whether they are eligible for CT or not. Similarly, a packet buffer 1326 in the IFI 1306 may store cell payloads for SAF cells, CT cells, or both, with the buffer circuitry 1318 storing cell pointers to CT queues or SAF queues defined in the packet buffer 1326.

Ingress CT Manager State

In one implementation, the ingress tile CT manager maintains the following state information for each egress port Egr_Port_i:

CT_Eligible: This field indicates if Egr_Port_i is eligible for CT.

Staging_FIFO_PktCntr: This is a packet-level counter to count the number of packets destined to Egr_Port_i which are currently in the staging buffer 1308 and have been resolved to go SAF but the SOP has not yet been dequeued from the Staging FIFO.

Pre_ENQ_PktCntr: This is a packet-level counter to count the number of packets destined to Egr_Port_i which have been resolved to go SAF and for which the SOP has been dequeued from the staging buffer 1308 but the packet has not yet been enqueued to the ingress tile.

Port_Counter: This is a per-port counter used to track number of packets destined to Egr_Port_i which are buffered in the ingress tile.

Port_Empty_Timer: This timer is used to cover the following time windows:

Propagation delay from the Ingress to the IFI for SAF packets

Delay to update the corresponding FDR_Empty_Bitmap and propagating this to the egress tile.

Safeguarding against the above time windows helps prevent reordering between packets from the same source port and going to the same destination port.

The timer remains set to a programmable value if the Port_Counter for Egr_Port_i (which keeps a count of post-enqueue SAF packets) is greater than zero. It starts counting down every clock once the Port_Counter decrements to 0 and is considered expired when its value reaches 0, i.e., when the Port_Counter has remained 0 for a fixed number of clocks.

Every Ingress tile monitors the state of this timer (expired or not) and communicates this state to the egress tiles (using the CT Port State control path) in a TDM manner for each of the system egress ports.

CT_Req_Cntr: This is a counter of the number of outstanding CT requests to Egr_Port_i.

CT_Src_Port: This field stores the source port id of a packet which is either awaiting a response to its CT request or is actively cutting through Egr_Port_i.

CT_Active: This field indicates if there is a packet currently cutting through Egr_Port_i.

Another example of the egress side eligibility check is: an SoP cell is allowed to place a CT request if:
(Egr_Port_i.CT_Eligible AND
Egr_Port_i.Staging_FIFO_PktCntr==0 AND
Egr_Port_i.Pre_ENQ_PktCntr==0 AND
Egr_Port_i.Port_Empty_Timer==0 AND
((Egr_Port_i.CT_Req_Cntr==0) OR
(Egr_Port_i.CT_src_port==Cell's src port)))

The eligibility check for MoP/EoP cells may be:
(Egr_Port_i.CT_Active==1 AND
Egr_Port_i.CT_Src_Port==Cell's src port).

Fabric CT Manager State

The fabric CT manager 1316 may maintain the following state information:

Port_Cntr: This is a packet-level counter to count the number of SAF packets which are buffered at the FDR for this egress port.

Every clock the fabric CT manager 1316 sends a K-bit bitmap (the FDR_Empty_Bitmap) to its coupled egress tile, where K is the number of local egress ports, indicating if that port's Port_Cntr is greater than or equal to zero.

Initial state:
Egr_Port_i.Port_Cntr=0.

Egress Tile CT Manager State

The egress tile CT manager 1312 may maintain the following state information per local egress port:

Ingress_Tiles_Empty_Bitmap: This is an N-bit bitmap (with one bit for each of the N Ingress tiles) to store if each of the ingress tiles are signaling empty for Egr_Port_i, e.g., if the Port_Empty_Timer for this port at each of the ingress tiles has expired or not. A 1'b value in this bitmap indicates that the corresponding Ingress tile has no SAF traffic for Egr_Port_i. Otherwise, the value in the bitmap for that Ingress tile is 0'b.

FDR_Empty: This is a 1-bit value to indicate if the FDR coupled to this Egress tile is empty for Egr_Port_i (1'b implies empty; 0'b implies non-empty).

Egress_PktCntr: This is a packet-level counter to count the number of SAF packets for Egr_Port_i at the local Egress tile.

CT_FIFO_CellCntr: This is a counter of the number of cells in the CT FIFO for Egr_Port_i.

CT_State: This field contains the CT state of Egr_Port_i. The different possible CT states are:

CT_INELIGIBLE—Port is ineligible for CT

CT_PREP—Port is SAF-empty and waiting to become available for CT

CT_AVAILABLE—Port is available for CT

CT_CLAIMED_ACTIVE—Port has been claimed for CT by one of the Ingress tiles and is awaiting an End_of CT Packet message i.e., the port is in the middle of cutting-through a packet.

CT_CLAIMED_SLEEPING—Port has been claimed for CT by one of the Ingress tiles and has seen the End_of CT_Packet message i.e. the port is not in the middle of cutting-through a packet.

CT_COMPLETING—Port is not empty but is in the middle of a CT packet (EOP for the currently cutting-through packet has not arrived yet).

Owner_Ingress_Tile: If Egr_Port_i is in CT_CLAIMED_ACTIVE or CT_CLAIMED_SLEEPING or CT_COMPLETING state, this field indicates the Ingress tile which owns this port.

Middle_of CT_Packet: This field indicates if Egr_Port_i is currently in the middle of cutting-through a packet.

CT_Drain_Timer: This timer is used to implement a dead time when Egr_Port_i is transitioning from CT to SAF mode. If Egr_Port_i is in CT_CLAIMED_ACTIVE or CT_CLAIMED_SLEEPING states and it becomes SAF-non-empty or sees a CT request from a non-owner ingress tile, this timer ensures that the port will finish transmitting all in-flight CT packets before starting to transmit any SAF packets.

The value of this timer is initially set to a MAX value which is the worst case time it will take for the EOP of the largest possible packet size (e.g., a jumbo packet) to arrive at the Egress depending on the port speed. When the Egress sees an End_of_CT_Packet message for that port, it is now ensured that the EOP of the CT packet has entered the staging buffer 1308 at the Ingress. The value of the timer is then reduced to a MIN value which is the worst case time it will take for the EOP of the packet to reach the head of the staging buffer 1308, traverse the Interconnect, and gets scheduled out of the egress tile.

CT_Prep_Timer: This timer is used to implement a dead time when a port is transitioning from SAF (CT_INELIGIBLE) to CT (CT_AVAILABLE) mode. It covers the propagation delay of CT Port State Messages from the Ingress to Egress and prevents re-ordering cases between back-to-back packets from the same source port and going to the same destination port.

The timer is set to a programmable value when a port enters the CT_PREP state on becoming SAF-empty, where:
An egress port is considered Empty if:
(Egr_Port_i.Egress_PktCntr==0 AND
Egr_Port_i.FDR_Empty==1 AND
And of all bits in Egr_Port_i.Ingress_Tiles_Empty_Bitmap==1)

While in the CT_PREP state, every clock this timer starts counting down to 0. Any new CT requests for this port during this window (when this timer value is >0) are denied. When this timer value becomes 0, the port becomes available for CT and its state changes to CT_AVAILABLE.

The egress side CT eligibility check may be implemented as: grant a CT request when:
Egr_Port_i.CT_FIFO_Cntr<Threshold AND
(Egr_Port_i.CT_State==CT_AVAILABLE OR
((Egr_Port_i.CT_State==CT_CLAIMED_SLEEPING)
AND (Egr_Port_i.Owner_Ingress_Tile==Requestor's Ingress Tile)))

The first check may be done to make sure that the CT FIFO for that port does not build up beyond a certain value. This build-up can happen due to egress oversubscription. The second check may be done to ensure the port is in a state where it is safe to grant CT. If either of these two checks fails, the CT request is denied.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A method comprising:
   establishing a distributed buffering architecture comprising:
   an input packet buffer in an ingress tile;
   an output packet buffer in an egress tile, the input packet buffer and the output packet buffer not being located on shared memory; and
   at least one buffer in a switching fabric, the at least one buffer in the switching fabric being separate from the input packet buffer and the output packet buffer and being located between an ingress and an egress of the switching fabric;
   connecting the ingress tile and the egress tile with the switching fabric; and
   executing a distributed bandwidth grant mechanism between the ingress tile and the egress tile, through the switching fabric,
   wherein:
   the distributed bandwidth grant mechanism comprises a store-and-forward bandwidth credit grant mechanism,
   the method further comprises tracking, with an ingress queue scheduler, active virtual output queues (VoQs) defined in the input packet buffer,
   the distributed bandwidth grant mechanism further comprises a cut through grant mechanism in which packet cells immediately begin to flow through the switching fabric to the egress tile, and
   the method further comprises:
   receiving a packet cell in a staging buffer in the ingress tile; and
   making an ingress-side decision on whether the packet cell is ingress-side eligible for cut through to the egress tile.

2. The method of claim 1, further comprising:
   issuing a bandwidth credit request message to the egress tile for a selected active VoQ among the active VoQs.

3. The method of claim 2, further comprising:
   determining, with an egress credit scheduler, to grant bandwidth for the selected active VoQ responsive to the bandwidth credit request message; and communicating a credit grant message to the ingress tile through the switching fabric.

4. The method of claim 3, further comprising:
receiving the credit grant message at the ingress queue scheduler; and
transmitting a dequeue command from the ingress queue scheduler to an ingress context manager.

5. The method of claim 4, further comprising:
adding, by the ingress context manager, a dequeue context for the selected active VoQ responsive to the dequeue command;
issuing a buffer read command configured to cause dequeue of bytes from the selected active VoQ; and
transferring the bytes through the switching fabric to the egress tile.

6. The method of claim 1, further comprising:
when the packet cell is ingress-side eligible, transmitting a cut through request message to the egress tile through the switching fabric.

7. The method of claim 6, further comprising:
receiving the cut through request message at the egress tile; and
making an egress-side decision on whether the packet cell is egress-side eligible for cut through to the egress tile.

8. The method of claim 7, further comprising:
when the packet cell is egress-side eligible, transmitting a cut through grant message back to the ingress tile through the switching fabric.

9. The method of claim 8, further comprising:
receiving the cut through grant message at the ingress tile, and
transmitting the packet cell to a cut through queue in the switching fabric.

10. A machine comprising:
an ingress tile comprising:
an input packet buffer configured to store a whole received packet and an individual packet cell payload for an arriving packet; and
a staging buffer configured to store a packet cell pointer to the packet cell payload while a cut through decision is made for the arriving packet corresponding to the individual packet cell payload;
an egress tile comprising an output packet buffer configured to define a port-specific cut through buffer;
a switching fabric, including at least one buffer that is separate from the input packet buffer and the output packet buffer, the at least one buffer being located between an ingress and an egress of the switching fabric, the switching fabric being configured to connect the ingress tile to the egress tile; and
bandwidth allocation circuitry distributed between the ingress tile and the egress tile, the bandwidth allocation configured to:
decide store-and-forward bandwidth credit allocation for transferring the whole received packet from the input packet buffer to the output packet buffer; and
decide cut through bandwidth allocation for transferring the packet cell payload from the input packet buffer to the port-specific cut through buffer,
wherein the input packet buffer and the output packet buffer are not located on shared memory,
wherein cut through indicates that packet cells immediately begin to flow through the switching fabric to the egress tile, and
wherein the bandwidth allocation circuitry is further configured to perform tracking, with an ingress queue scheduler, active virtual output queues (VoQs) defined in the input packet buffer.

11. The machine of claim 10, wherein the bandwidth allocation circuitry comprises:
an ingress tile cut through manager configured to evaluate an ingress-side cut through eligibility criterion for the individual packet cell payload.

12. The machine of claim 11, wherein the ingress-side cut through eligibility criterion tests whether the whole received packet is destined for an output port in common with the arriving packet.

13. The machine of claim 10, wherein the bandwidth allocation circuitry comprises:
an egress tile cut through manager configured to evaluate an egress-side cut through eligibility criterion for the individual packet cell payload.

14. The machine of claim 13, wherein the egress-side cut through eligibility criterion tests whether an existing packet in the output packet buffer is destined for an output port in common with the arriving packet.

15. The machine of claim 10, wherein the ingress queue scheduler is further configured to:
issue a bandwidth credit request message to the egress tile for a selected active VoQ among the active VoQs;
receive a credit grant message; and
transmit a dequeue command from the ingress queue scheduler to an ingress context manager configured to schedule VoQs actively transmitting to the egress tile.

16. The machine of claim 15, wherein the bandwidth allocation circuitry comprises an egress credit scheduler configured to:
grant bandwidth for the selected active VoQ responsive to the bandwidth credit request message; and
communicate a credit grant message to the ingress tile through the switching fabric.

17. A machine comprising:
an ingress tile comprising:
an input packet buffer configured to store a whole received packet and an individual packet cell payload for an arriving packet; and
a staging buffer configured to store a packet cell pointer to the packet cell payload while a cut through decision is made for the arriving packet corresponding to the individual packet cell payload;
an egress tile comprising:
an output packet buffer configured to define a port-specific cut through buffer; and
a switching fabric connecting the ingress tile to the egress tile, the switching fabric comprising:
per-ingress tile store-and-forward buffers between an ingress and an egress of the switching fabric;
per-ingress tile cut through buffers between the ingress and the egress of the switching fabric;
first scheduling circuitry configured to select between the per-ingress tile store-and-forward buffers and the per-ingress tile cut through buffers to drive a first output lane to the egress tile; and
second scheduling circuitry configured to select between the per-ingress tile cut through buffers, but not the per-ingress tile store-and-forward buffers, to drive a second output lane for cut through cells to the egress tile,
wherein the input packet buffer and the output packet buffer are not located on shared memory, wherein cut through indicates that packet cells immediately begin to flow through the switching fabric to the egress tile, and wherein the machine further comprises circuitry configured to perform tracking, with an ingress queue scheduler, active virtual output queues (VoQs) defined in the input packet buffer.

18. The machine of claim 17, further comprising:

bandwidth allocation circuitry distributed between the ingress tile and the egress tile, the bandwidth allocation configured to:
  decide store-and-forward bandwidth credit allocation for transferring the whole received packet from the input packet buffer to the output packet buffer through the store-and-forward buffers of the fabric buffering circuitry; and
  decide cut through bandwidth allocation for transferring the packet cell payload from the input packet buffer to the port-specific cut through buffer through the cut through buffers of the fabric buffering circuitry.

* * * * *